(12) United States Patent
Barrow et al.

(10) Patent No.: US 7,822,437 B2
(45) Date of Patent: Oct. 26, 2010

(54) SYSTEM AND METHOD FOR DISPATCH ROAMING REGISTRATION

(75) Inventors: Steven W. Barrow, South Riding, VA (US); Safwan A. Khan, Gainesville, VA (US); Ojas T. Choksi, Herndon, VA (US); Arun Manroa, Herndon, VA (US)

(73) Assignee: Nextel Communications Inc., Reston, VA (US)

( * ) Notice: Subject to any disclaimer, the term of this patent is extended or adjusted under 35 U.S.C. 154(b) by 982 days.

(21) Appl. No.: 11/242,702

(22) Filed: Oct. 3, 2005

(65) Prior Publication Data

US 2006/0072517 A1   Apr. 6, 2006

Related U.S. Application Data

(60) Provisional application No. 60/647,018, filed on Jan. 27, 2005, provisional application No. 60/614,525, filed on Oct. 1, 2004.

(51) Int. Cl.
*H04M 1/00* (2006.01)

(52) U.S. Cl. ............... 455/552.1; 455/445; 455/433; 455/90.2; 455/90.3; 370/352; 370/355

(58) Field of Classification Search ............... 370/335, 370/441, 401, 352, 355; 455/433, 552.1, 455/445, 90.2, 90.3
See application file for complete search history.

(56) References Cited

U.S. PATENT DOCUMENTS

| | | | |
|---|---|---|---|
| 5,566,181 A * | 10/1996 | Huang et al. | 370/312 |
| 6,611,516 B1 * | 8/2003 | Pirkola et al. | 370/352 |
| 2002/0057668 A1 * | 5/2002 | Bos et al. | 370/349 |
| 2004/0037314 A1 * | 2/2004 | Spear | 370/466 |
| 2004/0121765 A1 * | 6/2004 | Idnani et al. | 455/422.1 |
| 2004/0190496 A1 * | 9/2004 | Albal et al. | 370/352 |
| 2004/0190535 A1 | 9/2004 | Albal et al. | |
| 2005/0114513 A1 * | 5/2005 | Dorenbosch et al. | 709/227 |
| 2005/0286542 A1 * | 12/2005 | Shores et al. | 370/401 |
| 2006/0056361 A1 * | 3/2006 | Jiang et al. | 370/335 |
| 2006/0063452 A1 * | 3/2006 | Moore | 442/199 |
| 2006/0063549 A1 | 3/2006 | Choksi | |
| 2006/0067265 A1 * | 3/2006 | Chen et al. | 370/328 |
| 2006/0072517 A1 | 4/2006 | Barrow et al. | |

* cited by examiner

*Primary Examiner*—Vincent P Harper
*Assistant Examiner*—Fred A Casca

(57) ABSTRACT

A system and method for providing an user the ability to roam onto a peer Integrated Digital Enhanced Network (iDEN) Network. An iGW supports the passing of Dispatch registration information back to the users home network. The iGW will also support and assist in setting up Dispatch Calls between the two iDEN Networks, and vice versa. Exemplary embodiments of the present invention also support roaming from another technology that supports Dispatch Services, where if a iDEN subscriber with a dual mode phone (i.e., iDEN & GSM), was to roam onto another carrier with a different technology but with Dispatch capabilities, the iDEN subscriber is able to register on the roaming carrier's network. The iGW is capable of receiving the registration update from the roaming network and updating the iDEN Network with the location of the iDEN Subscriber.

22 Claims, 23 Drawing Sheets

SYSTEM AND METHOD FOR DISPATCH ROAMING REGISTRATION

CROSS REFERENCES TO RELATED APPLICATIONS

The present invention claims priority to U.S. Provisional Patent Application No. 60/614,525, which was filed on Oct. 1, 2004, and U.S. Provisional Patent Application No. 60/647,018, which was filed on Jan. 27, 2005, the disclosures of which are incorporated herein by reference.

FIELD OF THE INVENTION

The present invention relates generally to push-to-talk (PTT) wireless communications systems and more particularly to systems and methods for facilitating roaming of PTT subscribers across disparate PTT networks.

BACKGROUND OF THE INVENTION

Wireless communications systems are operated worldwide by wireless carriers who offer services such as interconnect, short message service (SMS), packet data and push-to-talk. Each wireless communications system services subscribers within a coverage area and operates using one or more wireless technologies such as code division multiple access (CDMA), global system for mobile communication (GSM), time division multiple access (TDMA) or Advanced Mobile Phone Service (AMPS).

PTT services (also known as a walkie-talkie or dispatch services) are currently offered by some wireless carriers, such as Nextel's Direct Connect® service offered on an Integrated Digital Enhanced Network (iDEN), and new PTT services and technologies have been proposed, including dispatch to desktop (D2D), selective dynamic group call (SDGC) and private call (PC) services. Generally, a PTT call provides near-instant, half-duplex communication between a PTT caller and a target group of PTT users. In today's systems, subscribers on a network operated by a first wireless carrier cannot always engage in PTT calls with PTT subscribers on a network operated by a second wireless carrier. When subscribers are roaming globally, and may connect to wireless carriers operating on different technologies, some concerns includes call set up delays, number of control messages, and call loss rates due to inter-system roaming.

Accordingly, a need exists for an inter-system network that is optimized for PTT and other wireless communications among subscribers on different carrier networks, irrespective of subscriber and carrier location and underlying PTT technology.

SUMMARY OF THE INVENTION

The present invention is a system and method for PTT roaming registration. In one embodiment, an iDEN Gateway (iGW) supports the passing of dispatch registration information back to the user's home network. The iGW also supports and assists in setting up dispatch calls between two iDEN Networks. Exemplary embodiments of the present invention also support roaming from iDEN to another technology that supports dispatch services (i.e., CDMA QChat and GSM PoC). If an iDEN subscriber with a dual mode phone (i.e., iDEN & GSM) roams onto another carrier with a different technology but with dispatch capabilities, the iDEN subscriber may be able to register on the roaming carrier's PTT network. The iGW is adapted to receive the registration update from the roaming PTT network and update the iDEN network with the location of the iDEN Subscriber. If another iDEN subscriber attempts a dispatch call to the roaming iDEN subscriber, the iGW facilitates the dispatch call. This also works where a roaming unit with iDEN capabilities was to roam onto a iDEN Network.

A more complete understanding of the present invention will be afforded to those skilled in the art, as well as a realization of additional advantages and objects thereof, by a consideration of the following detailed description. Reference will be made to the appended sheets of drawings, which will first be described briefly.

BRIEF DESCRIPTION OF THE DRAWINGS

FIG. 1b illustrates an embodiment of the PII RF of FIG. 1a;

DETAILED DESCRIPTION OF THE PREFERRED EMBODIMENTS

Figure 1A:
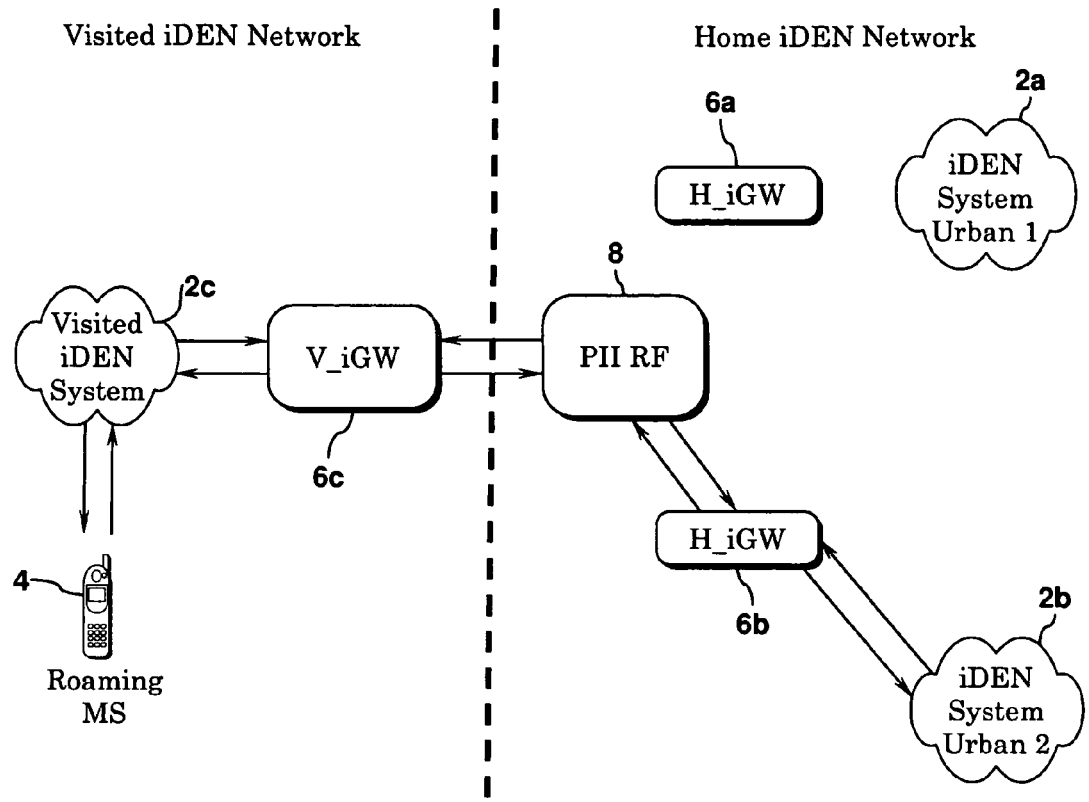
FIG. 1a illustrates a first exemplary system for providing dispatch roaming registration.

An exemplary embodiment of the present invention is illustrated in FIG. 1a. A Home iDEN Network includes at least one iDEN urban network 2a and 2b providing wireless services to mobile subscribers, at least one home iDEN gateway (H_iGW) 6a and 6b, and a PTT Interoperability Infrastructure Roaming Function (PII RF) 8. In one embodiment, the iGWs facilitate dispatch roaming registration for roaming subscribers that are roamed onto other PTT networks (e.g., iDEN, QChat, PoC, etc.), and also facilitate inter-network dispatch call (e.g., PC, CA & SDGC) setup between roaming and non-roaming subscribers. Generally, the iGWs connect an iDEN domain to another iDEN domain or to another domain, such as a SIP domain.

Figure 1B:
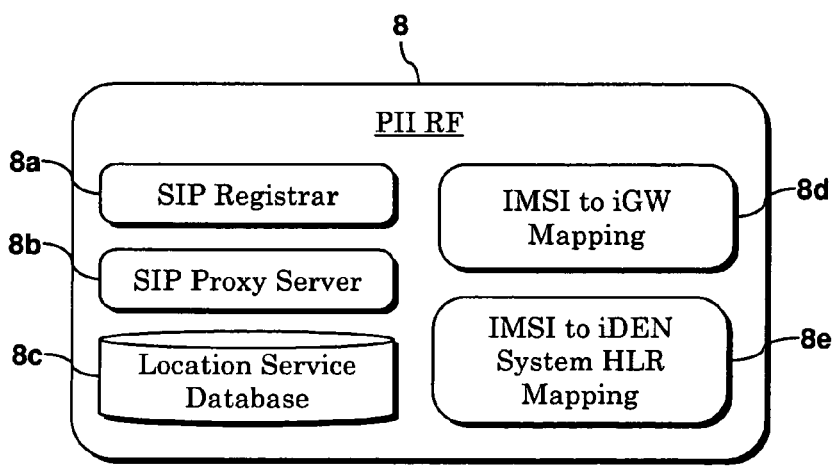

The PII RF 8 may reside outside of the Home iDEN Network. The PII RF 8 facilitates dispatch roaming registration via the iGWs and dispatch call setup between the Home iDEN Network and peer iDEN/3G networks. In one embodiment illustrated in FIG. 1b, the PII RF 8 includes functions of a SIP Registrar 8a, SIP Proxy Server 8b and a Location Service Database 8c. The PII RF may further include an IMSI to iGW mapping function 8d and a IMSI to iDEN System HLR mapping function 8e. In operation, upon receipt of a dispatch registration request the SIP Registrar 8a records the roaming subscriber's AoR (address of record) and the Contact information in the Location Services Database 8c. The SIP Registrar 8a uses the IMSI range mapping to route a Registration request to the serving Home iGW. As in iDEN, each Subscriber is identified by either IMSI or UFMI. IMSI base identification is used for future Registration updates and the UFMI based identification is used for Dispatch Call setup. The SIP Registrar 8a includes two AoRs (IMSI based and UFMI based) per One Contact for each Subscriber. In the exemplary embodiment, the PII RF uses standard SIP messages to communicate with the iGWs/3G IASs. During the Dispatch Call Setup, when queried by the Home iGW, the PII RF 8 queries the Location Service Database and returns the Contact information of the roamed-out subscriber.

As illustrated, a mobile subscriber 4, having iDEN system urban network 2b as a home network may roam throughout the Home iDEN Network, and on a Visited iDEN Network that includes a visited iDEN system 2c and a visited iDEN gateway (V_iGW) 4c. In operation, when the mobile subscriber 4 roams onto the Visited iDEN Network, the visited iDEN system 2c forwards a iDEN Dispatch Registration request to the subscriber's PII RF 8. The PII RF 8 determines the Home (serving) iGW 6b and forwards the registration request to the Home iDEN System Urban Network 2b via the Home iGW 6b. The Home iDEN System Urban Network 2b returns the iDEN Dispatch Registration parameters that the mobile subscriber 4 will require in the Visited iDEN Network to the PII RF 8 via the Home Gateway 6b. After the mobile subscriber 4 has successfully registered for dispatch service in the Visited iDEN System 2c, the Visited iDEN System 2c sends an update location request to the Home iDEN System Urban Network 2b via the PII RF 8.

Figure 2:
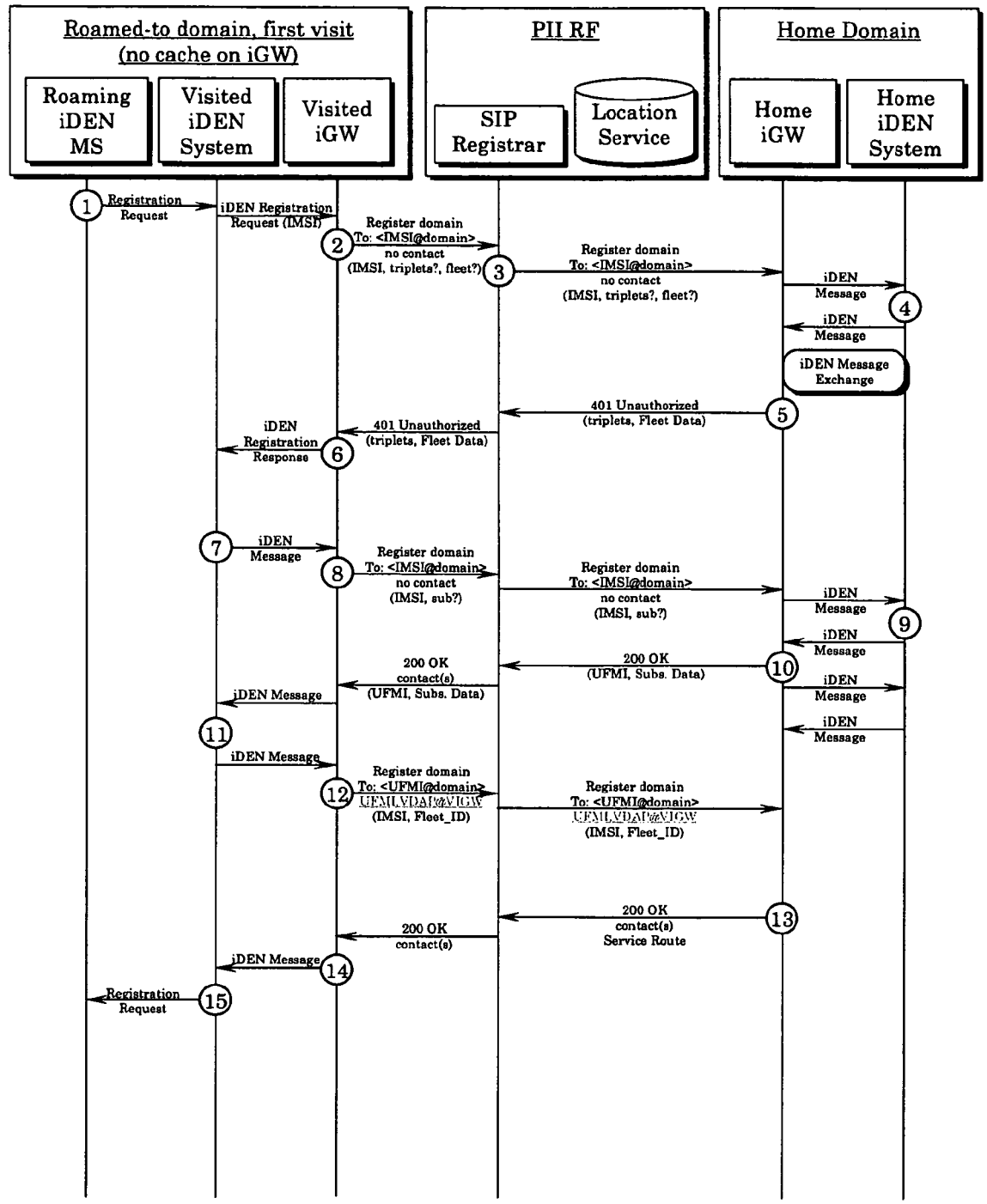
FIG. 2 is a call flow illustrating an embodiment of iDEN to iDEN dispatch roaming registration.

An embodiment of iDEN to iDEN dispatch roaming registration on an iGW is illustrated in the call flow diagram of FIG. 2. In this embodiment, an iDEN MS is roaming from a home iDEN network (e.g., operated by a first carrier) to a peer iDEN network (e.g., operated by a second carrier). In step 1, the Visited iDEN System receives a dispatch registration request from the Roaming iDEN MS and forwards the request, including the mobile subscribers IMSI, to a corresponding Visited iGW. In step 2, the Visited iGW receives the dispatch registration request and determines the home domain associated with the received IMSI. The Visited iGW then sends a SIP register message to the mobile subscriber's home PII RF. In step 3, the PII RF forwards the SIP register message to the home iGW serving the mobile subscriber's home iDEN system. In step 4, the registration request is forwarded to the home iDEN system using an iDEN protocol.

In step 5, the home iDEN system sends an authentication request to the visited iGW, including the subscriber's authentication triplets and associated fleet data. The visited iGW responds to the visited iDEN system in step 6. In step 7, the Visited iDEN System transmits a dispatch registration request to the Visited iGW, which then sends a SIP register message to the mobile subscriber's home PII RF in step 8. The PII RF forwards the SIP register message to the home iGW which forwards the registration request to the home iDEN system using an iDEN protocol.

In step 10, the Home iGW responds with SIP 200 OK including the mobile subscriber's UFMI which is forwarded via the PII RF to the Visited iGW, which forwards the acknowledgement to the Visited iDEN System as an iDEN message. In steps 11 and 12, the Visited iDEN System responds with a registration request that includes a mapping of the subscriber's address (UFMI@domain) to the Visited iDEN System (UFMI.VDAP@ViGW). The Home iGW responds in step 13 with a SIP acknowledgment message, which is forwarded to the Visited iDEN System in step 14. The mobile subscriber is notified that the registration request has been accepted in step 15.

Figure 3:
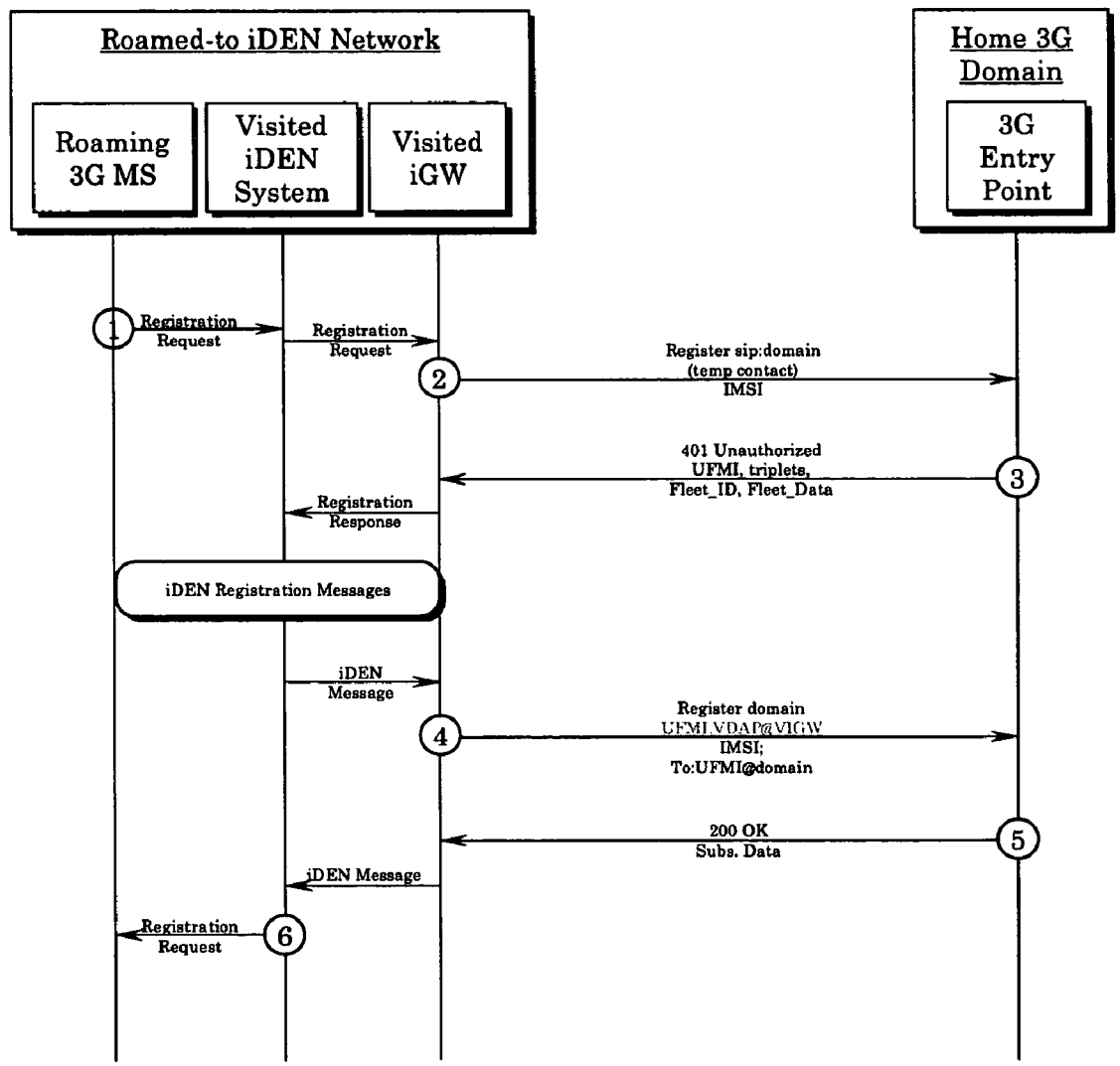
FIG. 3 is a call flow illustrating an embodiment of 3G to iDEN dispatch roaming registration.

An embodiment of 3G to iDEN dispatch roaming registration on an iGW is illustrated in the call flow diagram of FIG. 3. In this embodiment, a dual mode 3G subscriber has roamed into an iDEN network. In step 1, the Visited iDEN System receives a dispatch registration request from the Roaming 3G MS and forwards the request, including the mobile subscribers IMSI, to a corresponding Visited iGW. In step 2, the Visited iGW receives the dispatch registration request and determines the home domain associated with the received IMSI. The Visited iGW then sends a SIP register message to the mobile subscriber's home domain. In step 3, the home 3G domain sends an authentication request to the visited iGW, including the subscriber's authentication triplets and associated fleet data. The visited iGW responds to the visited iDEN with a registration response. In step 4, the Visited iDEN System responds with a registration request that includes a mapping of the Visited iDEN System (UFMI.VDAP@ViGW) to the subscriber's address (UFMI@domain). The Home 3G network responds in step 5 with a SIP acknowledgment message, which is forwarded to the Visited iDEN System. The mobile subscriber is notified that the registration request has been accepted in step 6.

Figure 4:
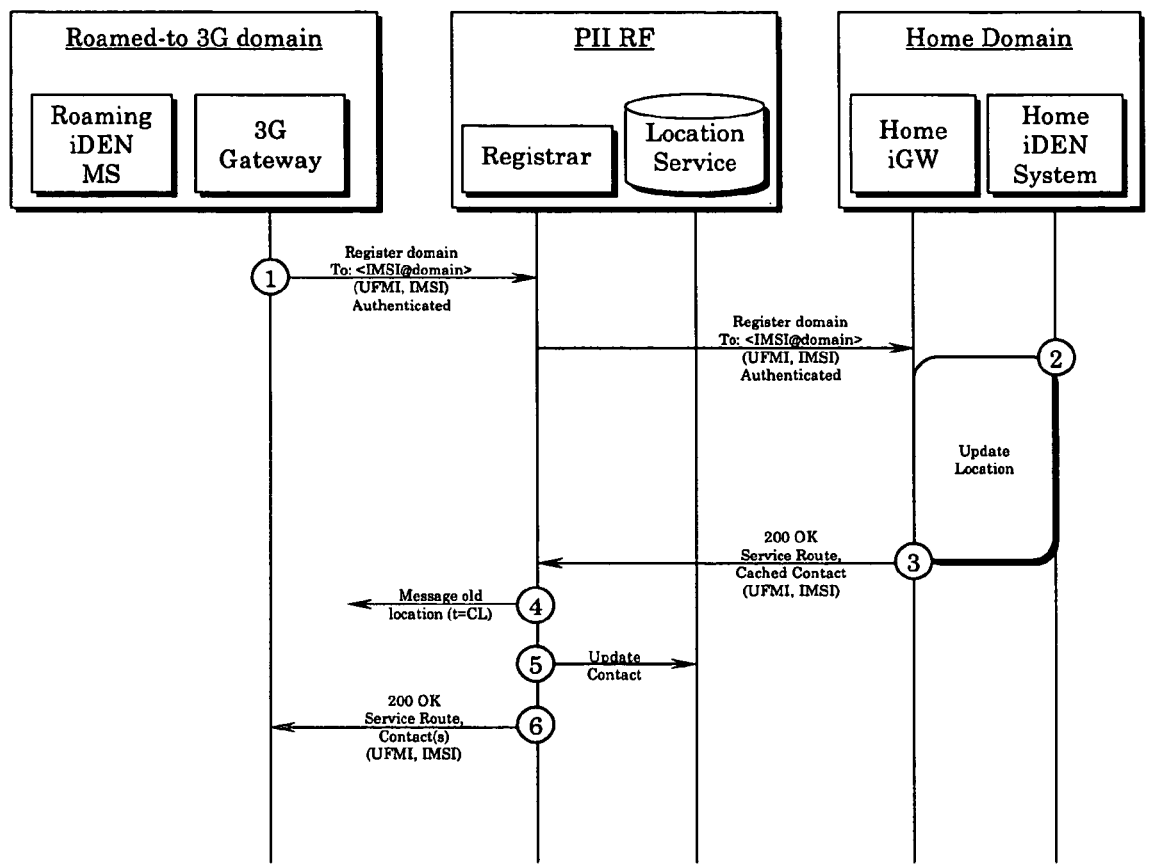
FIG. 4 is a call flow illustrating an embodiment of iDEN to 3G dispatch roaming registration.

An embodiment of iDEN to 3G dispatch roaming registration is illustrated in the call flow diagram of FIG. 4. In this embodiment, a dual mode iDEN subscriber has roamed into 3G network, QChat network, or other non-iDEN network. The dual-mode iDEN subscriber performs dispatch registration in accordance with the 3G protocol. After successful completion of the dispatch registration, the 3G IAS sends an "Update Location" message via the PII RF to the home iDEN system of the iDEN subscriber in step 1. In step 2, the iDEN System updates its database with the Subscriber's new location. In step 3 the Home iGW sends a SIP 200 OK message to the PII RF upon receipt of the subscriber's information (i.e., UFMI) from the Home iDEN system. In step 4 it sends a "Cancel Location: message to the previously registered network (iDEN or another network). Upon receipt of a 200 OK message the PII RF updates contact information in step 5 of this roaming iDEN Subscriber in the Location Services Database.

Figure 5:
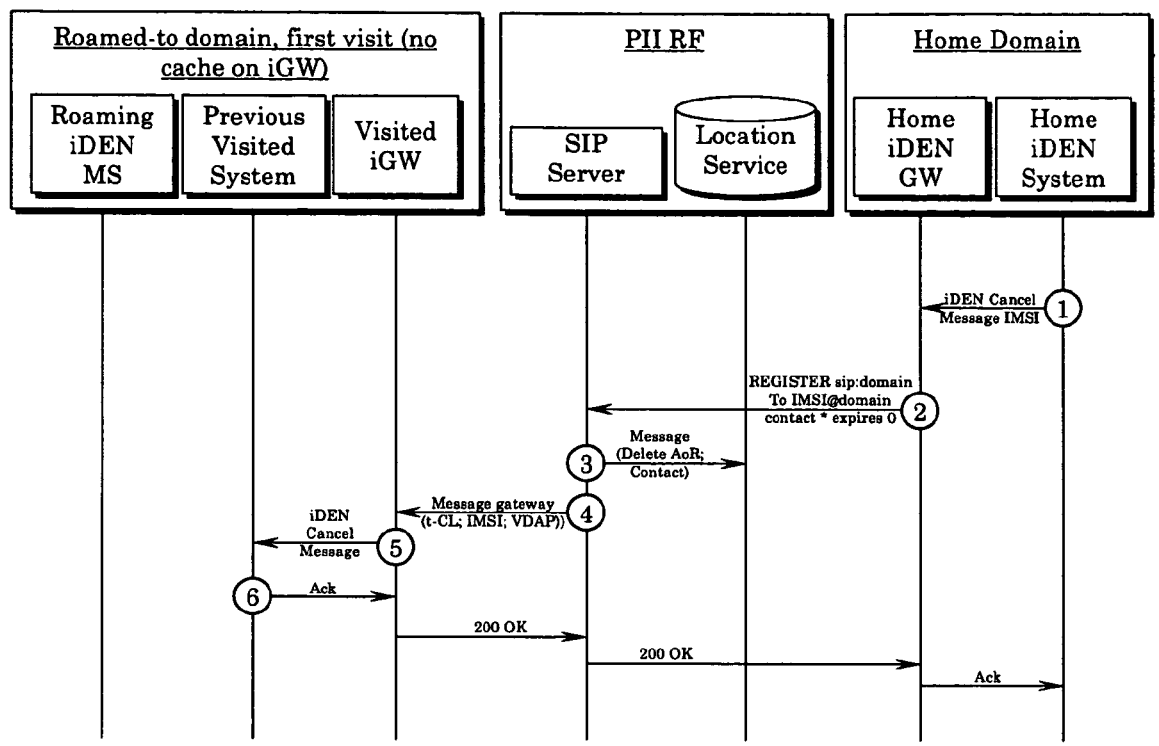
FIG. 5 is a call flow illustrating an embodiment of a pushing cancel location message.

An embodiment of pushing a cancel location message to a previous visited network is illustrated in the call flow diagram of FIG. 5. After completion of IMSI registration, the Home iDEN System sends a "Cancel Location" message with the IMSI to the Home iGW in step 1. In step 2, the Home iGW sends a SIP Register message with "contact * expires 0" to indicate the expiration of the current Registration to the PII RF. In step 3, the PII RF updates the Location service database and it sends a SIP Message to the Visited iGW in step 4. In step 5, the Visited iGW forwards a "Cancel Location" message to the previously Visited iDEN System. In step 6, an acknowledgement is returned to the Home domain.

In another embodiment, the roaming subscriber roams into a different Dispatch Urban in the same visiting iDEN network or roams into a different network without returning to the home network. Upon receipt of a new IMSI registration request, the PII RF updates the Location Service database and sends a SIP MESSAGE to indicate a "Cancel Location" message to the Visited iDEN System via the Visited iGW.

Figure 6:
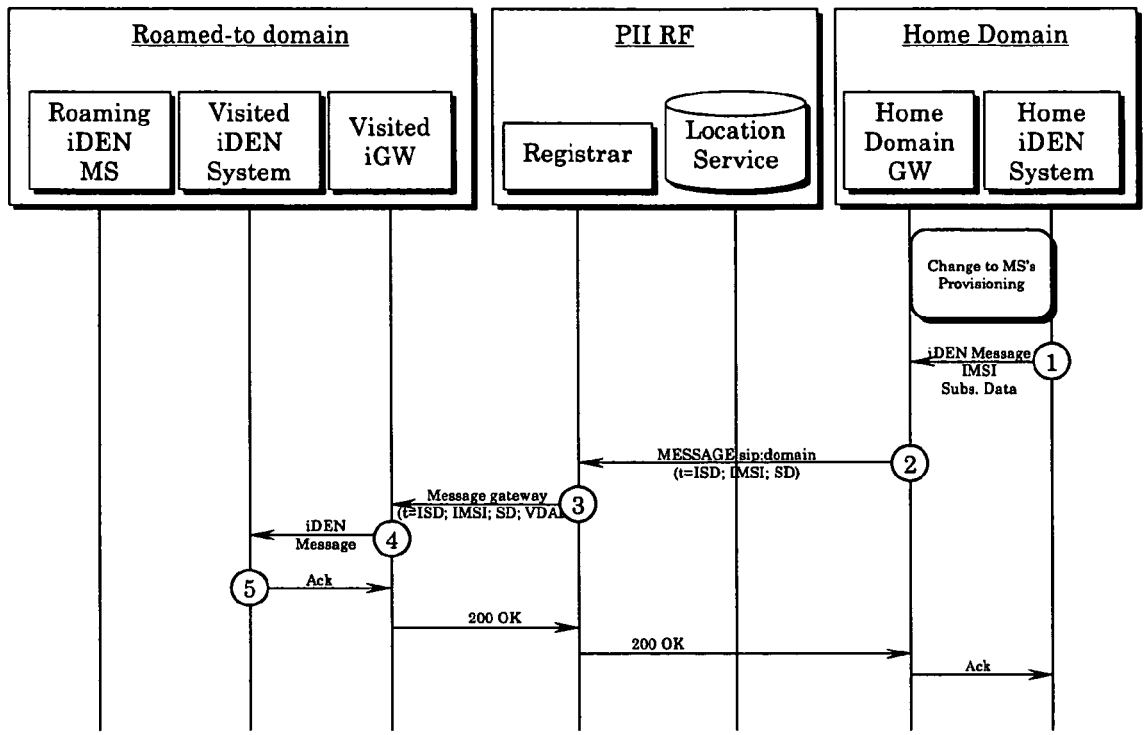
FIG. 6 is a call flow illustrating an embodiment of pushing provisioning changes.

FIG. 6 is a call flow illustrating an embodiment for pushing provisioning changes. Any provisioning changes in the Home iDEN System that impacts the roaming subscriber's dispatch profile, will result in the Home iDEN system to send a standard iDEN Message with the IMSI of roamer subscriber to the Home iGW (step 1). In step 2, the Home iGW will send a "SIP MESSAGE" that includes the ISD to the PII RF, which is forwarded to the Visited iGW in step 3. The Visited iGW forwards a standard iDEN Message to the Visited iDEN System in step 4. In step 5, an acknowledgement is returned to the Home domain.

Figure 7:
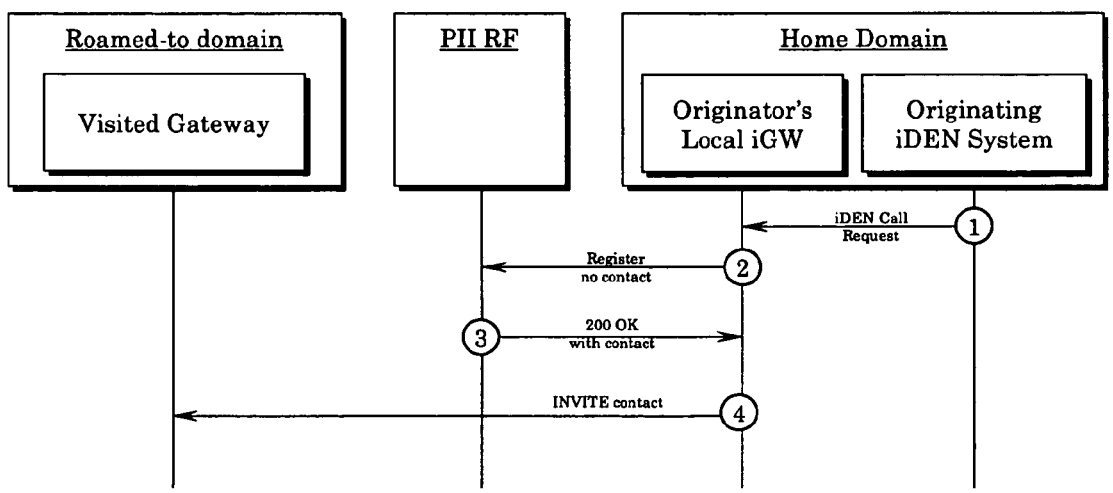
FIG. 7 is a call flow illustrating an embodiment of the provision of contact information for PTT calls.

FIG. 7 is a call flow illustrating an embodiment for providing contact information for PTT calls. In this embodiment, in step 1 the originating iDEN system receives an iDEN Call Request from a mobile subscriber and forwards the iDEN Call Request to the Originator's local iGW. In step 2, the Originator's Local iGW obtains contact information from the PII RF for a roaming subscriber via a SIP REGISTER message without contact. The PII RF responds in step 3 to the Originator's Local iGW with the contact information via a 200 OK message. In step 4, the Originator's Local iGW transmits an INVITE contact message to the roamed-to domain.

Figure 8:
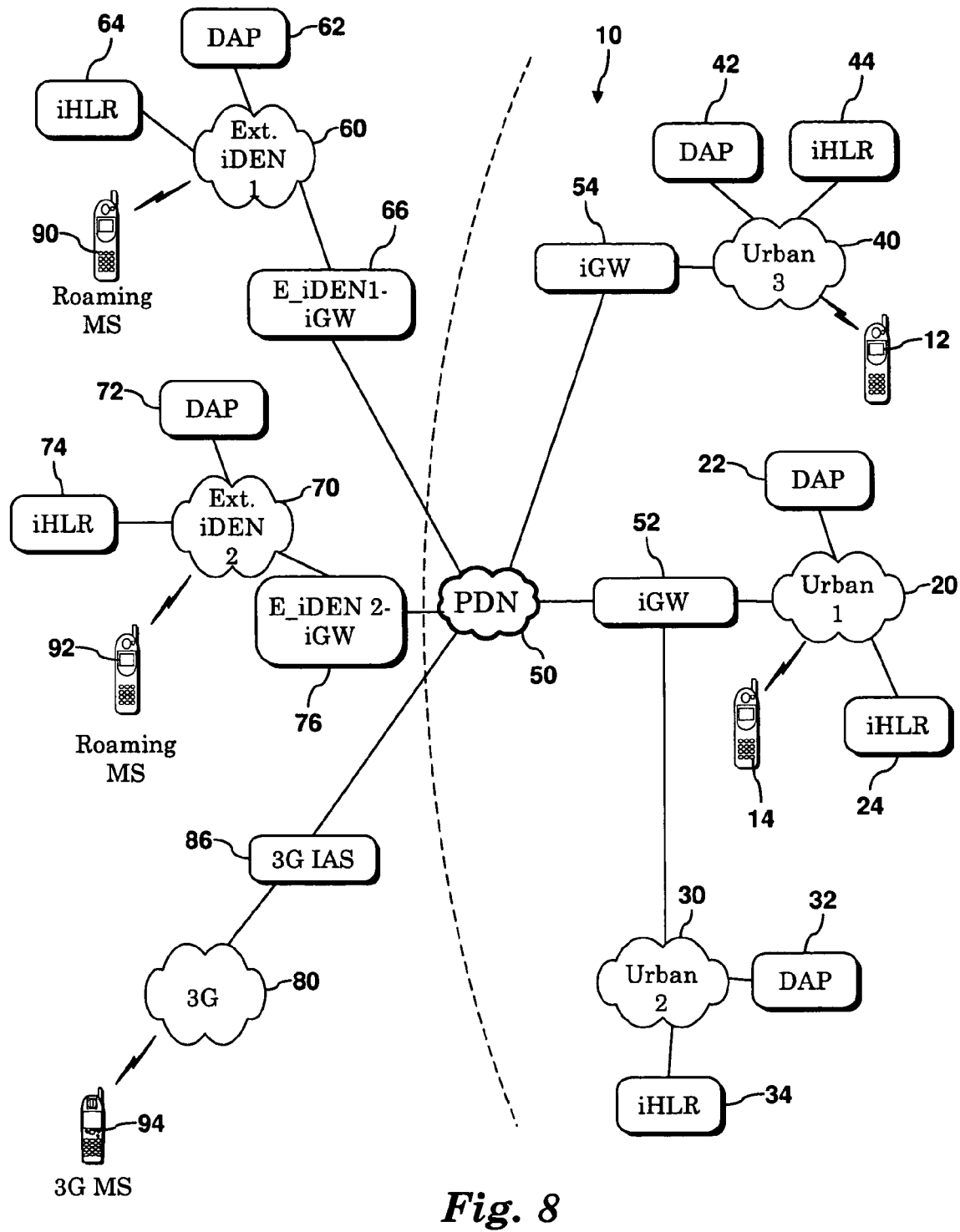
FIG. 8 illustrates a second exemplary system for providing dispatch roaming registration.

A second exemplary embodiment of the present invention will be described with reference to FIG. 8. A wireless communications system 10 provides wireless services to a plurality of mobile subscribers, such as mobile subscribers 12 and 14. The exemplary wireless communications system 10 is an iDEN system spanning a plurality of urban areas. Each urban area is serviced by a local wireless network (20, 30 and 40) that includes a dispatch application processor (DAP 22, 32 and 42, respectively), and an iDEN Home Location Register (iHLR 24, 24 and 44, respectively). The urban networks 20 and 30 are connected to an iDEN gateway (iGW) 50 that provides an interface with a packet data network (PDN) 52. The urban network 40 is interfaced with the PDN 52 through an iGW 54.

The mobile subscribers 12 and 14 may include any device that is adapted for communications with the wireless communications system 10. For example, the mobile subscribers 12 and 14 may include wireless devices such as mobile telephones, personal digital assistants and portable computers. Subscribers may also include wireline devices such as personal computers in communication with the wireless communications system 10 through the Internet. It will be appreciated that the illustrated network is exemplary and that any number of urban networks, wireless and wireline devices may be interfaced within the wireless communications system 10.

The PDN 52 connects the iDEN system 10 with one or more external communications systems, such as external iDEN network (E_iDEN1) 60, external iDEN network (E_iDEN2) 70 and a third generation (3G) network 80, supporting a 3G dispatch technology such QChat or PTT over Cellular (PoC). The external iDEN network 60 includes a DAP 62 and an iHLR 64, and is interfaced with the PDN 52 through an E_iDEN1-iGW interface 66. The external iDEN network 70 includes a DAP 72 and an iHLR 74, and is interfaced with the PDN 52 through an E_iDEN2-iGW interface 76. The 3G network 80 is interfaced with the PDN 50 through an Internet Authentication Service (IAS) server 86. The external communications systems 60, 70 and 80 may be operated by different carriers and may use different dispatch technologies and protocols.

It will be appreciated that other external communications systems may be interfaced to the wireless communications system 10 through the PDN 50. In alternate embodiments the external communications systems may support wireless protocols such as time division multiple access (TDMA), code division multiple access (CDMA), wideband CMDA (WCDMA), Advanced Mobile Phone Service (AMPS), Global System for Mobile Communications (GSM), General Packet Radio Services (GPRS), High Data Rate (HDR) technology or voice and data services provided over a broadband network such as WiFi, WiMax, an 802 protocol or similar system.

The system of the exemplary embodiment provides seamless dispatch registration to roaming users in other networks via the iGW. Through the system of the exemplary embodiment, dispatch roaming may be facilitated via the iGW with very little or no change to the existing iDEN infrastructure, including DAPs and iHLRs.

In operation, a mobile subscriber, such as mobile subscribers 90 and 92, of the iDEN network 10 may roam onto a peer iDEN network, such as iDEN networks 60 and 70. The iGWs support the passing of dispatch registration information back to the mobile subscriber's home network. The iGW may also support and assist in setting up dispatch calls between two iDEN networks. The exemplary embodiment also supports roaming to another technology that supports dispatch services (i.e. CDMA QChat and GSM PoC), where if a mobile subscriber 94 with a dual mode phone (i.e. iDEN & GSM), roams onto carrier network 80, the mobile subscriber 94 is able to register on the roaming carrier's network 80. Each iGW is capable of receiving the registration update from the roaming network and updating the iDEN network 10 with the location of the mobile subscriber 94. If another mobile subscriber, such as mobile subscriber 12, attempts a dispatch call to the roaming mobile subscriber 94, the iGW facilitates the dispatch call. The iGW also supports dispatch calls with a mobile user who roams onto the iDEN network 10.

In the exemplary embodiment, the iGWs 52 and 54 use Session Initiation Protocol (SIP) messages to support roaming registration between networks. The iGWs are responsible for initiation and termination of SIP sessions. The iGW also facilitates iDEN subscriber to roam and register on a peer iDEN carrier network, and to register subscribers roaming on the iGW's corresponding network. The iGW facilitates other technology carriers (e.g., PoC and QChat) to roam and register on an iDEN network. The iGW is capable of receiving registration updates from the visiting network regardless of technology used by the visiting network. The iGW registration supports passing registration information back to the subscriber's home network. The iGW may support standard dispatch calls, private calls, call alerts and SDGC for registered roamers either in an iDEN network or on to a visiting network. The user experience is seamless across the networks and across the iGWs. The iGW also supports dynamic information about roaming users (mobility management, registration cancel messages). The iGW of the exemplary embodiment does not negatively impact the iGWs existing dispatch call setup delay (e.g. Private Call, Call Alert and Selective Dynamic Group Call). The iGW shall also contribute no or minimal latency to the existing iDEN Dispatch International Mobile Subscriber Identity (IMSI) registration process due to implementation of this registration feature.

In the exemplary embodiment, the iGW supports iDEN MAPT messages relating to the registration process (i.e., Get Serving DVLR ("Dispatch Visitor Location Register") Requests & Responses, Authentication Requests & Responses, etc.). The iGW supports a new Roaming Registration Cache Table or, alternatively, is able to update it's existing 2G and 3G Cache Tables with Roaming Registration information (i.e., IMSI, UFMI (Urban Fleet Member ID) and Serving IAS). The iGW will need to extract the IMSI and UFMI of the roaming subscriber, the UFMI would be used by the iGW to create a UFMI→← Network iD Mapping and/or an UFMI→← DAP iD Mapping to be used for Dispatch Calls. The iGW supports the implementation of IMSI ranges in its Global Title Translation (GTT) file, where the IMSI ranges will point the iGW to the roaming subscriber's Home Network. The present embodiment supports IMSI Registrations. IMEI (International Mobile Equipment Identity) Registrations, which are triggered when an iDEN unit is Master reset or first time power up of an iDEN unit, are not supported in the exemplary embodiment. However, one skilled in the art will recognize how to support IMEI Registrations based on this disclosure. In the exemplary embodiment, the iGW Delivery 3 architecture is supported, a non-meshed network topology between the DAP(s), iHLR(s) and the iGW, where each iGW serves specific urban(s).

Some minimal changes may be required on the existing iDEN infrastructure (most notably DAPs and iHLR), as the iDEN DAP will need to support the implementation of a Proxy DAP for iDEN Registrations. The DAPs and iHLRs support the implementation of IMSI ranges in their GTT file, which will point to the iGW (Roaming Network IMSI Ranges). 3G users will have dual mode phone and have technology specific roaming profile in Nextel home 3G network. Nextel 3G users have dual mode phones with iDEN roaming profile in 3G networks.

FIGS. 9-13c illustrate exemplary signaling for roaming registration between peer iDEN networks via iGW. Specifically, the figures illustrate the signaling when an iDEN Subscriber roams from their home iDEN network (e.g., Nextel) to a roaming iDEN network (e.g., Telus), and performs a dispatch IMSI registration. This signaling illustrated in FIGS. 9-13c also apply for a dual mode (3G & iDEN) handset that roamed into the Nextel iDEN Network, where the home network elements (i.e., H_iGW, H_DAP and iHLR) are replaced by an IAS.

Roaming Registration between Peer iDEN Networks
First Embodiment

Figure 9:
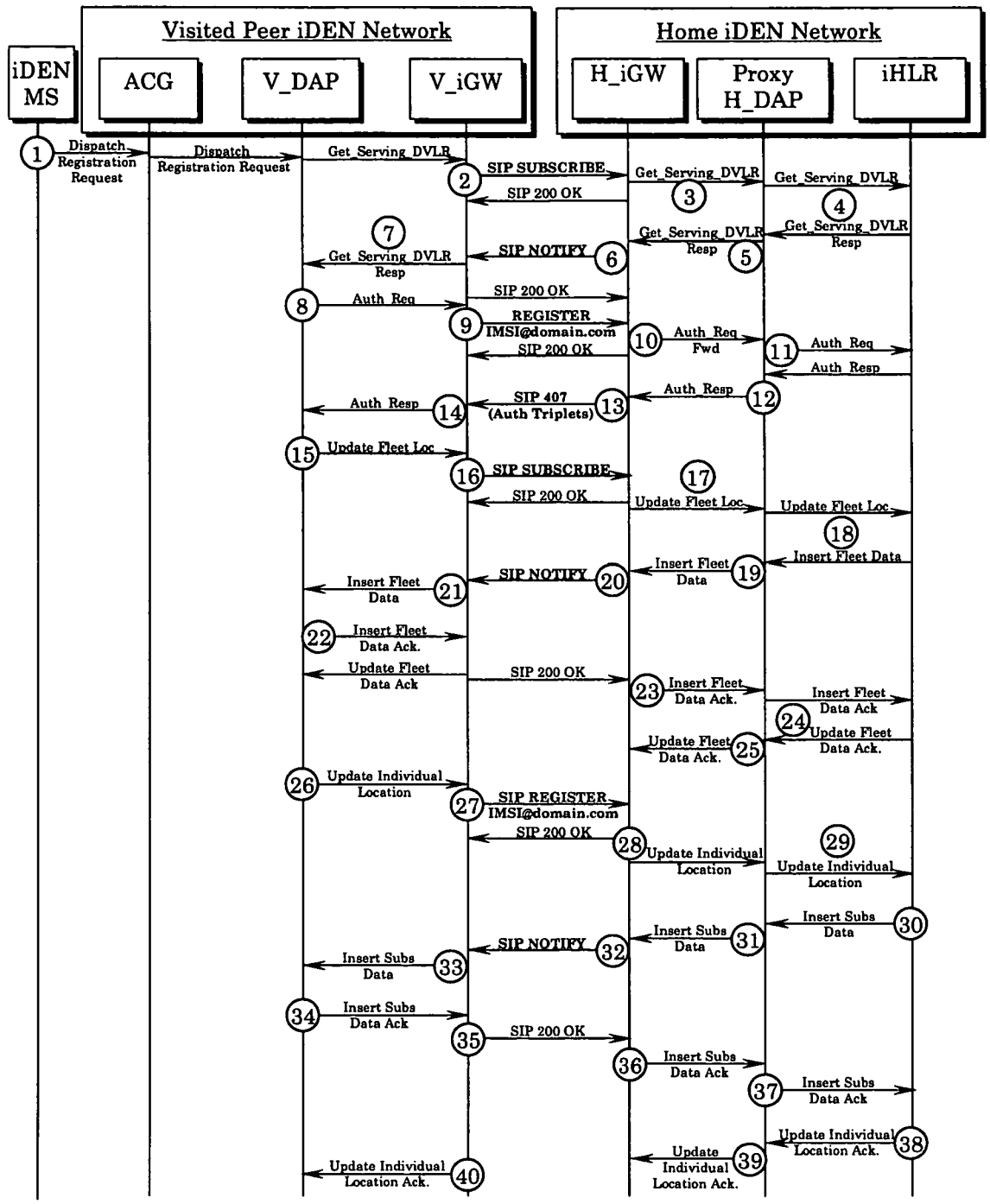
FIG. 9 illustrates signaling for roaming registration between peer iDEN networks via an iGW in accordance with one exemplary embodiment of the present invention.

Referring to FIG. 9, a first exemplary embodiment of signaling for roaming registration between peer iDEN networks via an iGW is illustrated. In accordance with this embodiment, SIP SUBSCRIBE is used to initiate the registration process and SIP REGISTER is used for authentication and location update. This embodiment takes advantage of the full mesh network on the iDEN side, by allowing the iGW to perform a "dumb forward" to any DAP (Proxy DAP) in the subscriber's Home Network, and the Proxy DAP queries the iHLR for the subscriber's information.

In step 1, as per standard iDEN protocol, the ACG ("access control gateway") in the Visited iDEN Network will forward a dispatch registration request received from the iDEN MS to the "Picked DAP" in the Roaming iDEN Network. The "Picked V_DAP" will perform a GTT Lookup on the subscriber's IMSI. The subscriber's IMSI should point to the V_iGW P-iHLR. The "Picked V_DAP" will send a "Get Serving DVLR Request" to the V_iGW (P-iHLR).

In step 2, the V_iGW receives the "Get Serving DVLR Request" and performs a GTT Lookup of the subscriber's IMSI to determine the subscriber's Home IAS (i.e., H_iGW). The V_iGW sends a SIP SUBSCRIBE message to the subscriber's H_iGW. In one embodiment, the SIP SUBSCRIBE message has a SIP URI in the form IMSI@domainname, an iDEN registration specific event field (i.e., Get DVLR/Subscriber Objects) and a limited expires field (i.e., 30 seconds). Upon receipt of the SIP SUBSCRIBE message, the H_iGW will send a SIP 200 OK back to V_iGW to acknowledge that the SIP SUBSCRIBE was received successful.

In step 3, the subscriber's H_iGW receives the SIP SUBSCRIBE message, which includes a Get Serving DVLR Request and Subscriber Objects Event, and selects a Proxy H_DAP to forward the iDEN "Get Serving DVLR Request." In the exemplary embodiment, the iDEN "Get Serving DVLR Request" includes the IMSI from the SIP URI and the DAP-ID (iGW's SaB ("Signaling and Bearer Board") ID). The Proxy H_DAP receives the "Get Serving DVLR Request" from the H_iGW and it performs a GTT Lookup on the subscriber's IMSI to determine the subscriber's iHLR.

In step 4, the Proxy H_DAP forwards the "Get Serving DVLR Request" to the subscriber's iHLR in response to the Get Serving DVLR Request. The subscriber's iHLR receives the "Get Serving DVLR Request" from the Proxy H_DAP and returns a "Get Serving DVLR Response" back to the Proxy H_DAP. As per standard iDEN Protocol, the "Get_Serving DVLR Response" contains the subscriber's Urban and Fleet information.

In step 5, upon receipt of the iDEN "Get Serving DVLR Response" from the iHLR, the Proxy H_DAP forwards the message to the H_iGW.

In step 6, the H_iGW uses a SIP NOTIFY to send the iDEN "Get Serving DVLR Response" to the V_iGW. In the exemplary embodiment, the SIP NOTIFY message has the SIP URI in the form IMSI@domainname, an iDEN registration specific event field (i.e., Get DVLR/Subscriber Objects) and the Content fields containing the subscriber's Urban and Fleet Information. Upon receipt of the SIP NOTIFY message, the V_iGW responds with SIP 200 OK message to acknowledge that the SIP NOTIFY was received successfully.

In step 7, upon receipt of the SIP NOTIFY message (Get Serving DVLR Response), the V_iGW forwards and uses the information in the Contents field (Urban and Fleet information) to query it's "Urban Fleet to Serving DAP Table" in order to determine if the Urban and Fleet is already served by another DAP in the Visited Network Urban. If the Urban and Fleet is not served by another DAP in the Visited Network Urban, then the V_iGW updates it's "Urban Fleet to Serving DAP Table" and forwards the iDEN "Get Serving DVLR Response" back to the Picked V_DAP to become the Serving V_DAP. Otherwise the V_iGW uses the "Urban Fleet to Serving DAP Table" to inform the Picked V_DAP via the iDEN "Get Serving DVLR Response," which DAP in the Urban serves the Roaming subscriber.

In step 8, as per standard iDEN Protocol, the V_DAP sends an Authentication Request to the V_iGW, (PiHLR) in order to obtain the subscriber's Authentication triplets.

In step 9, the V_iGW receives the "Authentication Request" and performs a GTT Lookup of the subscriber IMSI to determine the subscriber's Home IAS i.e., H_iGW. The V_iGW sends a SIP REGISTER message to the subscriber's H_iGW. In the exemplary embodiment, the SIP REGISTER message includes the Call-iD field in the form IMSI@domainname.

In step 10, upon receipt of SIP REGISTER (Authentication Request) from the V_iGW, the subscriber's H_iGW selects a Proxy H_DAP to forward the iDEN "Authentication Request." The iDEN "Authentication Request" includes the IMSI that was provided in the SIP REGISTER Call-iD field.

In step 11, the Proxy H_DAP receives the iDEN "Authentication Request" and performs a GTT Lookup on the subscriber's IMSI to determine the subscriber's iHLR. The Proxy H_DAP forwards the "Authentication Request" to the subscriber's iHLR. The iHLR returns an iDEN "Authentication Response" back to the selected DAP, where the iDEN "Authentication Response" contains the subscriber's Authentication triplets (i.e., Cipher Key Sequence Number, Random Number, Signed Response.).

In step 12, upon receipt of the iHLR's "Authentication Response," the Proxy H_DAP forwards the "Authentication Response" to the H_iGW. In step 13, the Subscriber's H_iGW sends a SIP 407 "Proxy Authentication required" message to the V_iGW, which includes the authentication triplets from the iDEN "Authentication Response" that was received from the Proxy H_DAP. In step 14, the V_iGW forwards the "Authentication Response" to the "Serving" V_DAP. Upon receipt of the Authentication Sets, the Roaming Network "Serving" V_DAP attempts to authenticate the subscriber via an iDEN "Authentication Challenge" message to the ACG.

Steps 15-25 involve iDEN "Update Fleet Location" messaging, and occurs if the iDEN Subscriber is the first subscriber from their fleet to roam into the Visiting Network's DAP, otherwise the iDEN "Update Individual Location" message is sent by the "Serving" V_DAP destined for the subscriber's iHLR.

In step 15, upon successful authentication of the roaming subscriber the "Serving" V_DAP forwards an iDEN "Update Fleet Location" Message to the V_iGW (PiHLR). In step 16, the V_iGW receives the iDEN "Update Fleet Location" message and sends a SIP SUBSCRIBE message to the subscriber's H_iGW. In the exemplary embodiment, the SIP SUBSCRIBE message includes the SIP URI in the form Urban*Fleet@domainname, an iDEN Registration specific Event field (i.e., Update Fleet) and a limited Expires field (i.e., 15 seconds). Upon receiving the SIP SUBSCRIBE message from the V_iGW, the H_iGW returns a SIP 200 OK message to the V_iGW, to acknowledge that the SIP SUBSCRIBE message was received successfully.

In step 17, the subscriber's H_iGW receives the SIP SUBSCRIBE message (Update Fleet Location), and it forwards an iDEN "Update Fleet Location" message to the Proxy H_DAP. The iDEN "Update Fleet Location" message includes the Urban and Fleet information from the SIP URI and the DAP-ID (iGW's SaB ID).

In step 18, the Proxy H_DAP forwards the "Update Fleet Location" message to the subscriber's iHLR. The subscriber's iHLR receives the "Update Fleet Location" message from the Proxy H_DAP and the iHLR updates its database with the Update Fleet Location message and returns an iDEN "Insert Fleet Data" message back to the Proxy H_DAP. In one embodiment, the iDEN "Insert Fleet Data" message contains information specific to the subscriber's fleet (i.e., Urban ID, Fleet ID, SCCH Information, Home Cell, Home DAP, Talkgroup Objects (Talkgroup ID, Dispatcher ID, PTT ID Flag, Talkgroup Priority, Home Cell), and Mode Objects (for MSTG: Mode ID, Primary Talkgroup ID, Secondary Talkgroup IDs)).

In step 19, upon receipt of the iHLR's iDEN "Insert Fleet Data" message, the Proxy H_DAP forwards the "Insert Fleet Data" message to the H_iGW. In step 20, the Subscriber's H_iGW sends a SIP NOTIFY message (notification to the subscribed event i.e., fleet objects) to the V_iGW. In the exemplary embodiment, the SIP NOTIFY message includes the SIP URI in the form Urban*Fleet@domainname, an iDEN Registration specific Event field (i.e., Update Fleet)) and the Content fields containing the iDEN Fleet Objects which were received from the Proxy H_DAP in step 19.

In step 21, the V_iGW forwards the iDEN "Insert Fleet Data" message to the "Serving" V_DAP. In step 22, upon receipt of the iDEN "Insert Fleet Data" message the "Serving" V_DAP returns an iDEN "Insert Fleet Data ACK" message back to the V_iGW. Upon receipt of the iDEN "Insert Fleet Data ACK" message the V_iGW sends a SIP 200 OK message to the H_iGW in order to acknowledge the SIP NOTIFY and it returns an iDEN "Update Fleet Data ACK" to the Serving V_DAP.

In step 23, upon receipt of the SIP 200 OK from the V_iGW, the H_iGW forwards an iDEN "Insert Fleet Data Ack" message to the Proxy H_DAP. In step 24, the Proxy H_DAP forwards the "Insert Fleet Data Ack" message to the subscriber's iHLR. Upon receipt of the "Insert Fleet Data Ack" the iHLR forwards an "Update Fleet Location Ack" message to the Proxy H_DAP.

In step 25, the Proxy H_DAP forwards the "Update Fleet Location Ack" message to the H_iGW. In one embodiment, V_iGW (PiHLR responds with Ack to serving V_DAP) and saving additional message between the H_iGW and the V_iGW with an Ack. With in the SIP SUBSCRIBE message (for fleet objects) any event related to Update Fleet Location is subscribed to and the expiry timer is set.

In step 26, the Roaming Network "Serving" V_DAP forwards an iDEN "Update Individual Location" message to the V_iGW (PiHLR). The iDEN "Update Individual Location" message is used to update the CVLR field (Current VLR) of the subscriber's iHLR. In one embodiment, the iDEN Update Individual Location message includes the subscriber's IMSI and "Serving" DAP's IP Address.

In step 27, the V_iGW receives the "Update Individual Location" message and sends a SIP REGISTER message to the subscriber's H_iGW. Prior to forwarding the "Update Individual Location" message to the H_iGW, the V_iGW updates it's Roaming Registration Cache table with the subscriber's IMSI, dummy UFMI and Serving DAP IP Address and then changes the "Serving" DAP IP Address in the "Update Individual Location" message to the V_iGW's 3G Signaling IP Address. The SIP REGISTER message may have the Call iD field in the form IMSI@domainname and the expires field may be set to a maximum value (i.e., 136 years). The H_iGW acknowledges the SIP REGISTER message containing the "Update Individual Location" message by returning a SIP 200 OK to the V_iGW.

In step 28, prior to forwarding the "Update Individual Location" message to the Proxy H_DAP, the H_iGW updates it's Roaming Registration Cache table with the subscriber's IMSI, dummy UFMI and Serving DAP IP Address (V_iGW 3G Signaling IP Address) and then changes the "Serving" DAP IP Address in the iDEN "Update Individual Location" message to the H_iGW's SaB (PDAP-iD).

In step 29, the Proxy H_DAP receives the iDEN "Update Individual Location" message and it forwards the "Update Individual Location" message to the subscriber's iHLR. In step 30, the subscriber's iHLR updates the Roaming iDEN Subscriber's CVLR field with the "Serving DAP" IP Address, which is the iGW SaB IP Address. The iHLR returns an "Insert Subscriber Data" message back to the Proxy H_DAP. In one embodiment, the iDEN "Insert Subscriber Data" message contains subscriber specific Dispatch and Packet Data information (IMSI, IMEI, SCCH Information, Urban ID, Fleet ID, Member ID, Dispatch Service Flag, PC Service Flag, CA Service Flag, MS Status Service Flags, Cross Fleet Service Flag, SDGC Service Flag, PC Priority, SDGC Priority, Emergency GC Service Flags, ISSEI Service Flag, GC Service Flag, Talkgroup/Mode List, PD Service Flag, PD Encryption parameters, PD Compression parameters, Mobile Node Restriction List, Host Domain Restriction List, WiDEN Service Flag, MN IP Address, HA IP Address, Mobile IP Security Parameter Index, Mobile IP Authentication Key, Browser Gateway Address, DNS Address, Dispatch Roaming Flag, Long Distance Dispatch Calling Flag, Home DAP). Further, it is not shown here, but as per standard iDEN Protocol, if the roaming subscriber was previously registered on different home network DAP, the iHLR sends "Cancel Location" message to the last serving home network DAP. Old serving H_DAP removes VLR information and acknowledges the Cancel Location message from iHLR.

In step 31, upon receipt of the iHLR's "Insert Subscriber Data" message, the Proxy H_DAP forwards the iDEN "Insert Subscriber Data" message to the H_iGW. In step 32, upon receiving of the iDEN "Insert Subscriber Data" message from the Proxy H-DAP, the Subscriber's H_iGW updates it's Roaming Registration Cache table with the subscriber's UFMI (replace the dummy UFMI) and then sends a SIP NOTIFY message to the V_iGW. The SIP NOTIFY message includes the SIP URI in the form IMSI@domainname, an iDEN Registration specific Event field (i.e., Get DVLR/Subscriber Objects) and the Content fields containing the subscriber's Subscriber Objects.

In step 33, the V_iGW updates its Roaming Registration Cache table with the subscriber's UFMI (replace the dummy UFMI) and then forwards an iDEN "Insert Subscriber Data" message to the Roaming Network "Serving" V_DAP with the information that was obtained in the SIP NOTIFY message. In step 34, the "Serving" V_DAP acknowledges the subscriber provisioning information and it sends an "Insert Subscriber Data Ack" destined for the iHLR via the V_iGW (PiHLR).

In step 35, V_iGW sends 200 OK back to subscriber H_iGW simply acknowledging the SIP NOTIFY and Insert Subscriber Data Ack, which it received from serving V_DAP. In step 36, H-iGW sends "Insert Subscriber Data Ack" to Proxy H_DAP. In step 37, the Proxy H_DAP forwards the "Insert Subscriber Data Ack" to the iHLR. In step 38, the Subscriber's iHLR acknowledges the Proxy H_DAP, and sends an "Individual Location Update Ack" message to the Proxy H_DAP.

In step 39, the Subscriber's Home Network Proxy H_DAP forwards an "Update Individual Location Ack" message to the H_iGW. In step 40, the V_iGW forwards an "Update Individual Location Ack" message to the "Serving" V_DAP. In one embodiment, the V_iGW (PiHLR responds with Ack to serving V_DAP) and saving additional message between the H_iGW and the V_iGW with a simple Ack. Further, in the SIP SUBSCRIBE message (for subscriber objects) a subscription is created for any event related to Update Subscriber Location and the expiry timer set. Next, as per standard iDEN protocol, the "Serving" V_DAP forwards an iDEN "Registration Accept" message to the Roaming Subscriber via the ACG.

Roaming Registration between Peer iDEN Networks
Second Embodiment

Figure 10:
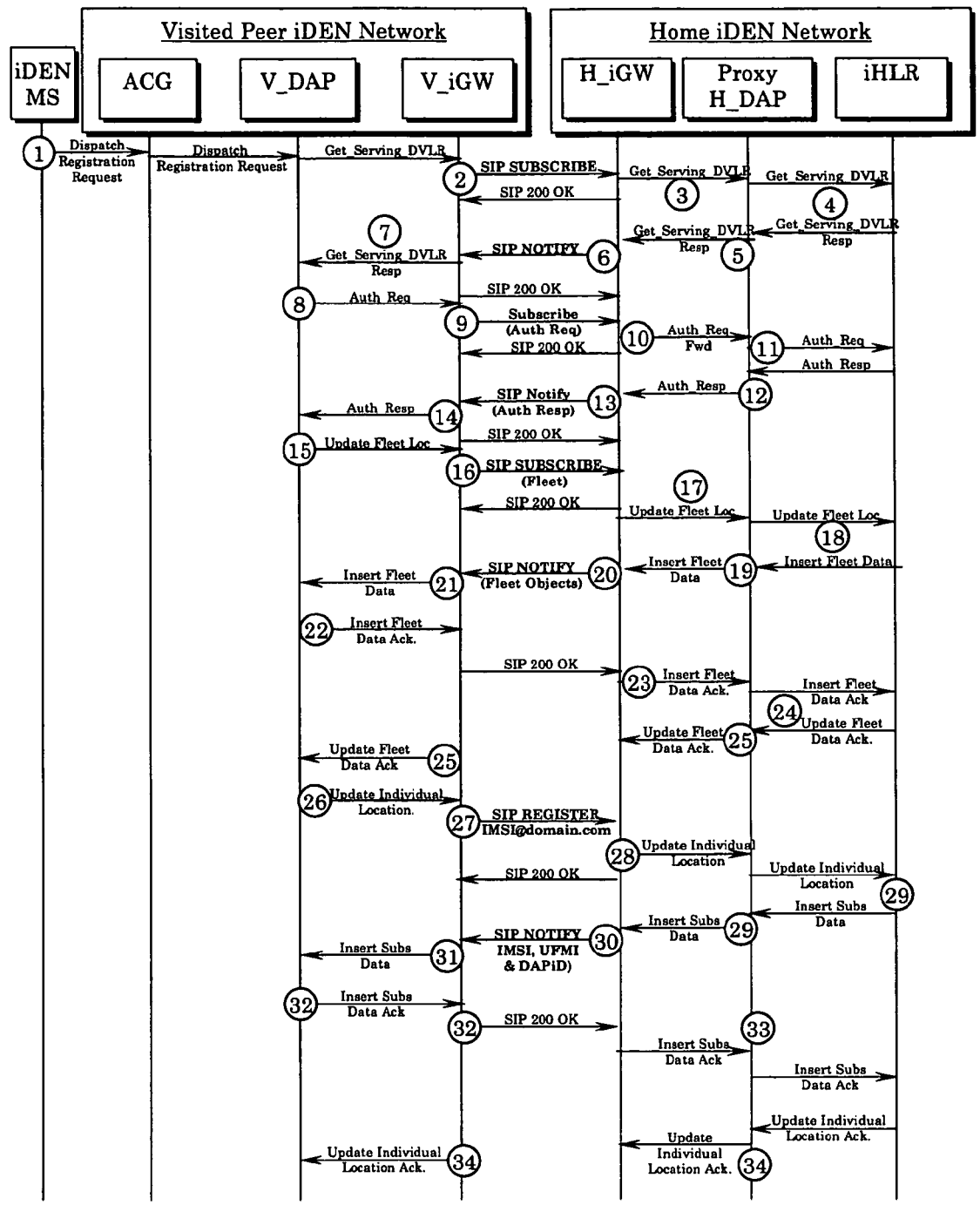
FIG. 10 illustrates signaling for roaming registration between peer iDEN networks via the iGW in accordance with a second exemplary embodiment of the present invention.

FIG. 10 illustrates another embodiment of signaling for roaming registration between peer iDEN networks via an iGW in accordance. In accordance with this embodiment, SIP SUBSCRIBE is used to initiate the Registration process and SIP REGISTER is only used for Location Update. This embodiment takes advantage of the full mesh network on the iDEN side, by allowing the iGW to perform a "dumb forward" to any DAP (Proxy DAP) in the subscriber's Home Network, and the Proxy DAP queries the iHLR for the subscriber's information.

In step 1, as per standard iDEN protocol, the ACG in the Roaming iDEN Network forwards the Dispatch Registration Request from the iDEN MS to the "Picked DAP" in the Visted iDEN Network. The "Picked V_DAP" performs a GTT Lookup on the subscriber's IMSI. In one embodiment, the subscriber's IMSI points to the V_iGW P-iHLR. The "Picked V_DAP" sends a "Get Serving DVLR Request" to the V_iGW (P-iHLR).

In step 2, the V_iGW receives the "Get Serving DVLR Request" and it performs a GTT Lookup of the subscriber's IMSI to determine the subscriber's Home IAS (i.e., H_iGW). The V_iGW sends a SIP SUBSCRIBE message to the subscriber's H_iGW. In one embodiment, the SIP SUBSCRIBE message includes the SIP URI in the form IMSI@domainname, an iDEN Registration specific event field (i.e., Get Serving DVLR/Subscriber Objects) and limited expiry field (i.e., 30 secs). Upon receipt of the SIP SUBSCRIBE message, the H_iGW sends a SIP 200 OK back to V_iGW, to acknowledge that the SUBSCRIBE was received successful.

In step 3, the subscriber's H_iGW receives the SIP SUBSCRIBE message (Get Serving DVLR and Insert Subscriber Objects event), and it selects a Proxy H_DAP to forward the iDEN "Get Serving DVLR Request." The iDEN "Get Serving DVLR Request" includes the IMSI from the SIP URI and the DAP-iD (iGW's SaB iD). The Proxy H_DAP receives the "Get Serving DVLR Request" from the H_iGW and it performs a GTT Lookup on the subscriber's IMSI to determine the subscriber's iHLR.

In step 4, the Proxy H_DAP forwards the "Get Serving DVLR Request" to the subscriber's iHLR for response to Get Serving DVLR Request. The subscriber's iHLR receives the "Get Serving DVLR Request" from the Proxy H_DAP and it returns a "Get Serving DVLR Response" back to the Proxy H_DAP. As per standard iDEN Protocol, the "Get_Serving DVLR Response" contains the subscriber's Urban and Fleet information.

In step 5, upon receipt of the iDEN "Get Serving DVLR Response" from the iHLR, the Proxy H_DAP forwards the message to the H_iGW. In step 6, the H_iGW uses a SIP NOTIFY to send the iDEN "Get Serving DVLR Response" to the V_iGW. In one embodiment, the SIP NOTIFY message includes the SIP URI in the form IMSI@domainname, and iDEN Registration specific Event field (i.e., Get DVLR/Subscriber Objects) and the Content fields containing the subscriber Urban and Fleet information. Upon receipt of the SIP NOTIFY message, the V_iGW responds with SIP 200 OK message to acknowledge that the NOTIFY was received successfully.

In step 7, upon receipt of the SIP NOTIFY message (Get Serving DVLR Response), the V_iGW forwards use the information in the Contents field (Urban and Fleet information) to query it's "Urban Fleet to Serving DAP Table" in order to determine if the Urban and Fleet is already served by another DAP in the Visited Network Urban. If the Urban and Fleet is not served by another DAP in the Visited Network Urban, then the V_iGW updates it's "Urban Fleet to Serving DAP Table" and forwards the iDEN "Get Serving DVLR Response" back to the Picked V_DAP to become the Serving V_DAP. Otherwise the V_iGW uses the "Urban Fleet to Serving DAP Table" to inform the Picked V_DAP via the iDEN "Get Serving DVLR Response," which DAP in the Urban serves the Roaming subscriber.

In step 8, as per standard iDEN Protocol, the V_DAP sends an Authentication Request to the V_iGW, (PiHLR) in order to obtain the subscriber's Authentication triplets. In step 9, the V_iGW receives the "Authentication Request" and it performs a GTT Lookup of the subscriber IMSI to determine the subscriber's Home IAS i.e., H_iGW. The V_iGW sends a SIP SUBSCRIBE message to subscriber H_iGW. The H_iGW responds with SIP 200 OK message to acknowledge that the SIP SUBSCRIBE was received successfully.

In step 10, upon receipt of SIP SUBSCRIBE message from the V_iGW, the subscriber's H_iGW selects a Proxy H_DAP to forward the iDEN "Authentication Request." The iDEN "Authentication Request" includes the IMSI that was provided in the SIP SUBSCRIBE. In step 11, the Proxy H_DAP receives the iDEN "Authentication Request" and performs a GTT Lookup on the subscriber's IMSI to determine the subscriber's iHLR. The Proxy H_DAP forwards the "Authentication Request" to the subscriber's iHLR. The iHLR returns an iDEN "Authentication Response" back to the selected DAP, where the iDEN "Authentication Response" contains the subscriber's Authentication triplets (i.e., Cipher Key Sequence Number, Random Number, Signed Response.).

In step 12, upon receipt of the iHLR's "Authentication Response," the Proxy H_DAP forwards the "Authentication Response" to the H_iGW. In step 13, the Subscriber's H_iGW sends a SIP NOTIFY message to the V_iGW, which contains the iDEN "Authentication Response" that was received from the Proxy H_DAP. Upon receiving SIP NOTIFY, V_iGW sends SIP 200 OK back to V_iGW to acknowledge that the SIP NOTIFY was received successfully.

In step 14, the V_iGW forwards the "Authentication Response" to the "Serving" V_DAP. Upon receipt of the Authentication Sets, the Roaming Network "Serving" V_DAP attempts to authenticate the subscriber via an iDEN "Authentication Challenge" message to the ACG.

In one embodiment, the steps 15-24, which involve the iDEN "Update Fleet Location" messaging, only occur if the iDEN Subscriber is the first subscriber from their fleet to roam into the Visiting Network's DAP, otherwise the iDEN "Update Individual Location" message is sent by the "Serving" V_DAP destined for the subscriber's iHLR.

In step 15, upon successful authentication of the roaming subscriber the "Serving" V_DAP forwards an iDEN "Update Fleet Location" Message to the V_iGW (PiHLR).

In step 16, the V_iGW receives the iDEN "Update Fleet Location" message and it sends a SIP SUBSCRIBE message to the subscriber's H_iGW. In one embodiment, the SIP SUBSCRIBE message includes the SIP URI in the form Urban*Fleet@domainname, an iDEN Registration Specific Event field (i.e., Update Fleet) and limited Expires field (i.e., 15 secs). Upon receiving the SIP SUBSCRIBE message from V_iGW, the H_iGW returns a SIP 200 OK to the V_iGW to acknowledge that the SIP SUBCRIBE message was received successfully.

In step 17, the subscriber's H_iGW receives the SIP SUBSCRIBE message (Update Fleet Location), and it forwards an iDEN "Update Fleet Location" message to the Proxy H_DAP. The iDEN "Update Fleet Location" message includes the Urban and Fleet information from the SIP URI and the DAP-iD (iGW's SaB ID).

In step 18, the Proxy H_DAP forwards the "Update Fleet Location" message to the subscriber's iHLR. The subscriber's iHLR receives the "Update Fleet Location" message from the Proxy H_DAP and the iHLR updates its database with the Update Fleet Location message and returns an iDEN "Insert Fleet Data" message back to the Proxy H_DAP. In one embodiment, the iDEN "Insert Fleet Data" message includes information specific to the subscriber's fleet (i.e., Urban ID, Fleet ID, SCCH Information, Home Cell, Home DAP, Talkgroup Objects (Talkgroup ID, Dispatcher ID, PTT ID Flag, Talkgroup Priority, Home Cell), and Mode Objects (for MSTG: Mode ID, Primary Talkgroup ID, Secondary Talkgroup IDs)).

In step 19, upon receipt of the iHLR's iDEN "Insert Fleet Data" message, the Proxy H_DAP forwards the "Insert Fleet Data" message to the H_iGW. In step 20, the Subscriber's H_iGW sends a SIP NOTIFY message (notification to the subscribed event i.e., fleet objects) to the V_iGW. In one embodiment, the SIP NOTIFY message includes the SIP URI in the form Urban*Fleet@domainname, an iDEN Registration specific Event field (i.e., Update Fleet) and the Content fields containing the iDEN Fleet Objects which were received from the Proxy H_DAP in step 19.

In step 21, the V_iGW forwards the iDEN "Insert Feet Data" message to the "Serving" V_DAP. In step 22, upon receipt of the iDEN "Insert Fleet Data" message the "Serving" V_DAP returns an iDEN "Insert Fleet Data Ack" message back to the V_iGW. Upon receipt of the iDEN "Insert Fleet Data Ack" message the V_iGW sends a SIP 200 OK message to the H_iGW in order to acknowledge the SIP NOTIFY and it returns an iDEN "Update Fleet Data Ack" to the Serving V_DAP.

In step 23, upon receipt of SIP 200 OK from the V_iGW, the H_iGW forwards an iDEN "Insert Fleet Data Ack" message to the Proxy H_DAP. In step 24, the Proxy H_DAP forwards the "Insert Fleet Data Ack" message to the subscriber's iHLR. Upon receipt of the "Insert Fleet Data Ack" the iHLR forwards an "Update Fleet Location Ack" message to the Proxy H_DAP.

In step 25, the Proxy H_DAP forwards the "Update Fleet Location Ack" message to the H_iGW. In one embodiment, the V_iGW (PiHLR responds with Ack to serving V_DAP) and saving additional message between the H_iGW and the V_iGW with an Ack. Further, in the SIP SUBSCRIBE message (for fleet objects) a subscription is requested for any event related to Update Fleet Location and the expiry timer is set. In step 26, the Roaming Network "Serving" V_DAP forwards an iDEN "Update Individual Location" message to the V_iGW (PiHLR). The "Update Individual Location" message is used to update the CVLR field (Current VLR) of the subscriber's iHLR. In one embodiment, the iDEN Update Individual Location message includes the subscriber's IMSI and "Serving" DAP's IP Address.

In step 27, the V_iGW receives the "Update Individual Location" message and it sends a SIP REGISTER message to the subscriber's H_iGW. Prior to forwarding the "Update Individual Location" message to the H_iGW, the V_iGW updates it's Roaming Registration Cache table with the subscriber's IMSI, dummy UFMI and Serving DAP IP Address and then change the "Serving" DAP IP Address in the "Update Individual Location" message to the V_iGW's 3G Signaling IP Address. In one embodiment, the SIP REGISTER message has the Call iD field in the form IMSI@domainname and the Expires field is set to a maximum value. The H_iGW acknowledges the SIP REGISTER message containing the "Update Individual Location" message by returning a SIP 200 OK to the V_iGW.

In step 28, prior to forwarding the "Update Individual Location" message to the Proxy H_DAP, the H_iGW updates it's Roaming Registration Cache table with the subscriber's IMSI, dummy UFMI and Serving DAP IP Address (ViGW 3G Signaling IP Address) and then changes the "Serving" DAP IP Address in the iDEN "Update Individual Location" message to the H_iGWs SaB (PDAP-iD). The Proxy H_DAP receives an iDEN "Update Individual Location" message and forwards the iDEN "Update Fleet Location" message to the subscriber's iHLR.

In step 29, the subscriber's iHLR updates the Roaming iDEN Subscriber's CVLR field with the "Serving DAP" IP Address, which includes the iGW SaB IP Address. The iHLR returns an "Insert Subscriber Data" message back to the Proxy H_DAP. Upon receipt of the iHLR's "Insert Subscriber Data" message, the Proxy H_DAP forwards the iDEN "Insert Subscriber Data" message to the H_iGW. In one embodiment, the iDEN "Insert Subscriber Data" message contains subscriber specific Dispatch and Packet Data information (IMSI, IMEI, SCCH Information, Urban ID, Fleet ID, Member ID, Dispatch Service Flag, PC Service Flag, CA Service Flag, MS Status Service Flags, Cross Fleet Service Flag, SDGC Service Flag, PC Priority, SDGC Priority, Emergency GC Service Flags, ISSEI Service Flag, GC Service Flag, Talkgroup/Mode List, PD Service Flag, PD Encryption parameters, PD Compression parameters, Mobile Node Restriction List, Host Domain Restriction List, WiDEN Service Flag, MN IP Address, HA IP Address, Mobile IP Security Parameter Index, Mobile IP Authentication Key, Browser Gateway Address, DNS Address, Dispatch Roaming Flag, Long Distance Dispatch Calling Flag, Home DAP). In another embodiment, as per standard iDEN Protocol, if the roaming subscriber was previously registered on different home network DAP, the iHLR sends "Cancel Location" message to the last serving home network DAP. The old serving H_DAP removes VLR information and acknowledges the Cancel Location message from iHLR.

In step 30, Upon receiving of the iDEN "Insert Subscriber Data" message from the Proxy H-DAP, the Subscriber's H_iGW will need to update it's Roaming Registration Cache table with the subscriber's UFMI (replace the dummy UFMI) and then send a SIP NOTIFY message to the V_iGW. The SIP NOTIFY message should have the SIP URI as IMSI@domainname, an iDEN Registration specific Event field (i.e., Get DVLR/Subscriber Objects) and the Content fields containing the subscriber's "Subscriber Objects."

In step 31, the V_iGW updates its Roaming Registration Cache table with the subscriber's UFMI (replace the dummy UFMI) and then forwards an iDEN "Insert Subscriber Data" message to the Roaming Network "Serving" V_DAP with the information that was obtained in the SIP NOTIFY message. In step 32, the "Serving" V_DAP acknowledges the subscriber provisioning information and it sends an "Insert Subscriber Data Ack" destined for the iHLR via the V_iGW (PiHLR). ViGW sends 200 OK back to subscriber H_iGW simply acknowledging the SIP NOTIFY and Insert Subscriber Data Ack, which it received from serving V_DAP.

In step 33, H_iGW sends "Insert Subscriber Data Ack" to Proxy H_DAP. The Proxy H_DAP forwards the "Insert Subscriber Data Ack" to the iHLR. The Subscriber's iHLR acknowledges the Proxy H_DAP, and sends an "Individual Location Update Ack" message to the Proxy H_DAP.

In step 34, the Subscriber's Home Network Proxy H_DAP forwards an "Update Individual Location Ack" message to the H_iGW. The V_iGW forwards an "Update Individual Location Ack" message to the "Serving" V_DAP. In one embodiment, the V_iGW (PiHLR responds with Ack to serving V_DAP) and saving additional message between H_iGW and the V_iGW with an Ack. Further, within the SIP SUBSCRIBE message (for subscriber objects) a subscription is requested for any event related to Update Subscriber Location and the expiry timer is set. Next, as per standard iDEN Protocol, the "Serving" V_DAP forwards an iDEN "Registration Accept" message to the Roaming Subscriber via the ACG.

Roaming Registration between Peer iDEN Networks
Third Embodiment

Figure 11A:
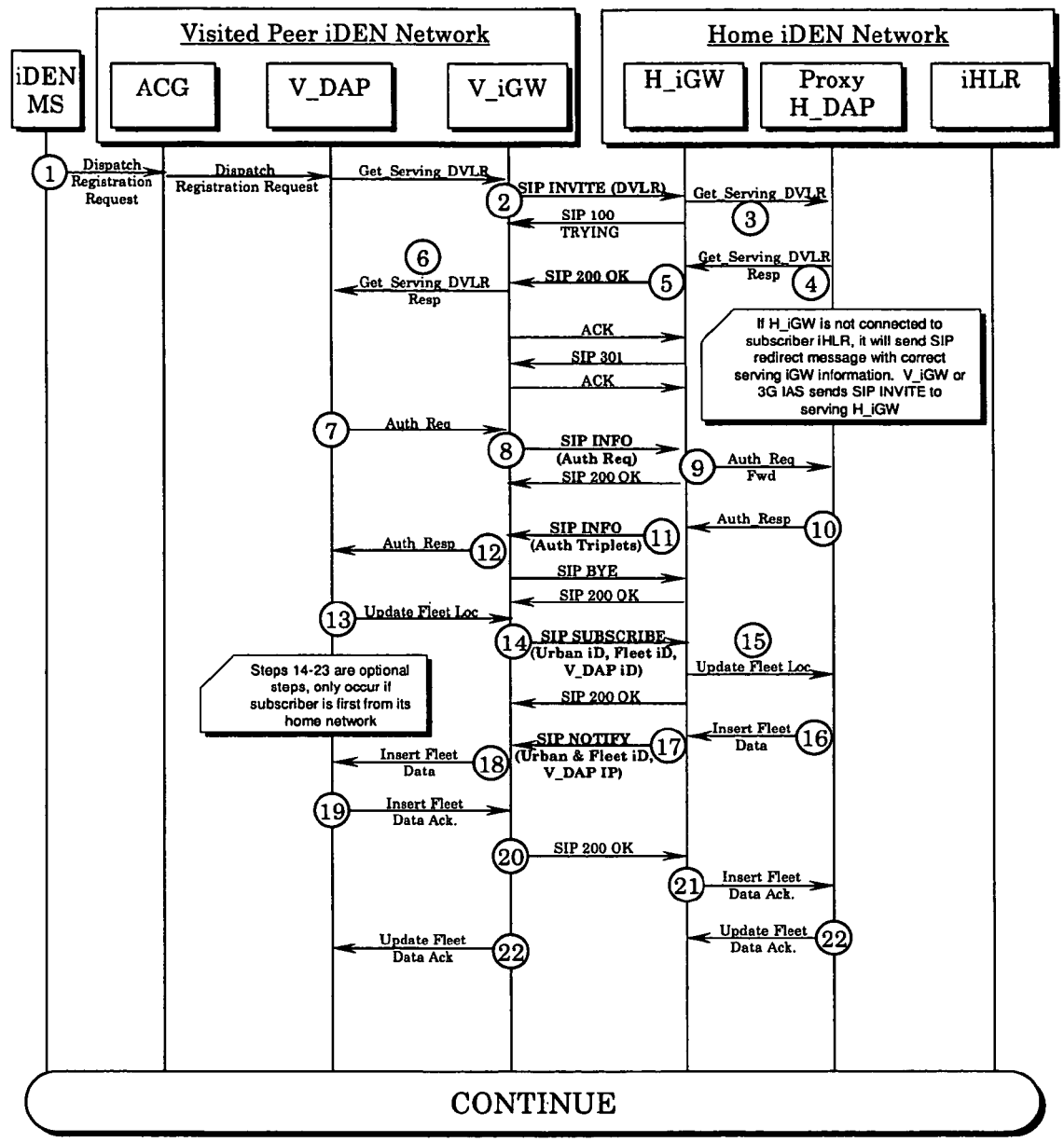
FIGS. 11a and 11b illustrate signalling for roaming registration between peer iDEN networks via the iGW in accordance with a third exemplary embodiment of the present invention.
Figure 11B:
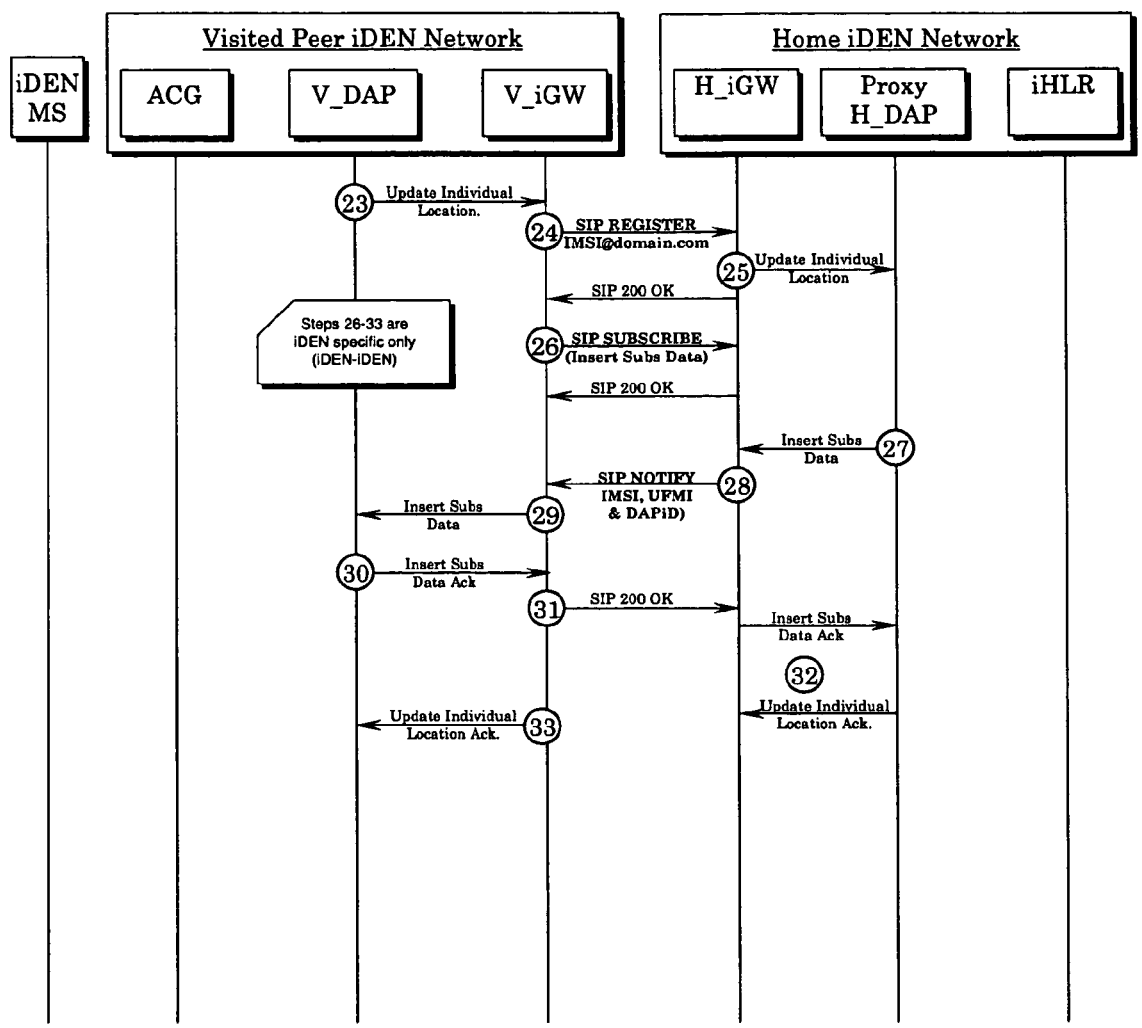

FIGS. 11a and 11b illustrate a third embodiment of signaling for roaming registration between peer iDEN networks via an iGW. In accordance with this embodiment, a SIP INVITE message is used for DVLR, SIP INFO message for Authentication, and SIP REGISTER message for Location Update. This embodiment does not require changes to the iDEN or 3G network elements.

In operation, in step 1, as per standard iDEN protocol, the ACG in the Roaming iDEN Network forwards the Dispatch Registration Request from the iDEN MS to the "Picked DAP" in the Roaming iDEN Network. The "Picked V_DAP" performs a GTT Lookup on the subscriber's IMSI. The subscriber's IMSI points to the V_iGW P-iHLR. The "Picked V_DAP" sends a "Get Serving DVLR Request" to the V_iGW (P-iHLR).

In step 2, the V_iGW receives the "Get Serving DVLR Request" and performs a GTT Lookup of the subscriber's IMSI to determine the subscriber's Home IAS (i.e. H_iGW). The V_iGW sends a SIP INVITE message to the subscriber's H_iGW. In one embodiment, the SIP INVITE message includes the SIP URI in the form IMSI@domainname. Upon receipt of the SIP INVITE message, the H_iGW sends a SIP 100 TRYING message back to V_iGW as iGW processing the message.

In step 3, H_iGW forwards "Get Serving DVLR Request" to subscriber iHLR.

In step 4, subscriber iHLR returns "Get Serving DVLR Response" to H_iGW, as per standard iDEN Protocol, the "Get_Serving DVLR Response" includes the subscriber's Urban and Fleet information. In step 5, H_iGW uses SIP 200 OK to send the iDEN "Get Serving DVLR Response" to V_iGW.

In step 6, upon receipt of the SIP 200 OK message (Get Serving DVLR Response), the V_iGW forwards and uses the information in the Contents field (Urban and Fleet information) to query it's "Urban Fleet to Serving DAP Table" in order to determine if the Urban and Fleet is already served by another DAP in the Visited Network Urban. If the Urban and Fleet is not served by another DAP in the Visited Network Urban, then the V_iGW updates it's "Urban Fleet to Serving DAP Table" and forwards the iDEN "Get Serving DVLR Response" back to the Picked V_DAP to become the Serving V_DAP. Otherwise the V_iGW uses the "Urban Fleet to Serving DAP Table" to inform the Picked V_DAP via the iDEN "Get Serving DVLR Response," which DAP in the Urban serves the Roaming subscriber. In one embodiment, if H_iGW is not the serving iGW for subscriber urban, it sends V_iGW a SIP REDIRECT message with IMSI ranges and the serving H_iGW for the subscriber. Upon receiving correct serving H_iGW information, V_iGW resends SIP INVITE to correct serving HiGW.

In step 7, as per standard iDEN Protocol, the V_DAP sends an Authentication Request to the V_iGW, (PiHLR) in order to obtain the subscriber's Authentication triplets. In step 8, the V_iGW receives the "Authentication Request" and performs a GTT Lookup of the subscriber IMSI to determine the subscriber's Home IAS i.e. H_iGW. The V_iGW sends SIP INFO message to subscriber's H_iGW. In step 9, upon receipt of SIP INFO (Authentication Request) from the V_iGW, the subscriber's H_iGW forwards the iDEN "Authentication Request" to subscriber iHLR. The iDEN "Authentication Request" includes the IMSI.

In step 10, subscriber iHLR returns an iDEN "Authentication Response" back to the selected H_iGW, where the iDEN "Authentication Response" includes the subscriber's Authentication triplets (i.e.: Cipher Key Sequence Number, Random Number, Signed Response.) In step 11, the Subscriber's H_iGW sends a SIP INFO message to the V_iGW, which includes the authentication triplets from the iDEN "Authentication Response" that was received from the subscriber iHLR.

In step 12, the V_iGW forwards the "Authentication Response" to the "Serving" V_DAP. Upon receipt of the Authentication Sets, the Roaming Network "Serving" V_DAP attempts to authenticate the subscriber via an iDEN "Authentication Challenge" message to the ACG. In one embodiment, steps 13-21, which involve the iDEN "Update Fleet Location" messaging, only occur if the iDEN Subscriber is the first subscriber from their fleet to roam into the Visiting Network's DAP, otherwise the iDEN "Update Individual Location" message is sent by the "Serving" V_DAP destined for the subscriber's iHLR.

In step 13, upon successful authentication of the roaming subscriber the "Serving" V_DAP forwards an iDEN "Update Fleet Location" Message to the V_iGW (PiHLR). In step 14, the V_iGW receives the iDEN "Update Fleet Location" message and it sends a SIP SUBSCRIBE message to the subscriber's H_iGW. In one embodiment, the SIP SUBSCRIBE message includes the SIP URI in the form Urban*Fleet@domainname, an iDEN Registration specific Event field (i.e.: Update Fleet) and a limited Expires field (i.e.: 15 seconds). Upon receiving the SIP SUBSCRIBE message from the V_iGW, the H_iGW returns a SIP 200 OK to the V_iGW to acknowledge that the SIP SUBSCRIBE message was received successfully.

In step 15, the subscriber's H_iGW receives the SIP SUBSCRIBE message (Update Fleet Location), and it forwards an iDEN "Update Fleet Location" message to the subscriber iHLR. The iDEN "Update Fleet Location" message includes the Urban and Fleet information from the SIP URI and the DAP-ID (iGW's SaB ID). In step 16, the subscriber's iHLR receives the "Update Fleet Location" message from the H_iGW and the iHLR updates its database with the Update Fleet Location message and returns an iDEN "Insert Fleet Data" message back to the H_iGW. In one embodiment, the iDEN "Insert Fleet Data" message includes information specific to the subscriber's fleet (i.e.: Urban ID, Fleet ID, SCCH Information, Home Cell, Home DAP, Talkgroup Objects (Talkgroup ID, Dispatcher ID, PTT ID Flag, Talkgroup Priority, Home Cell), and Mode Objects (for MSTG: Mode ID, Primary Talkgroup ID, Secondary Talkgroup IDs)).

In step 17, the Subscriber's H_iGW sends a SIP NOTIFY message (notification to the subscribed event i.e. fleet objects) to the V_iGW. In one embodiment, the SIP NOTIFY message includes the SIP URI in the form Urban*Fleet@domainname, an iDEN Registration specific Event field (i.e.: Update Fleet)) and the Content fields including the iDEN Fleet Objects which were received from the subscriber iHLR. In step 18, the V_iGW forwards the iDEN "Insert Fleet Data" message to the "Serving" V_DAP.

In step 19, upon receipt of the iDEN "Insert Fleet Data" message the "Serving" V_DAP returns an iDEN "Insert Fleet Data ACK" message back to the V_iGW. In step 20, upon receipt of the iDEN "Insert Fleet Data ACK" message the V_iGW sends a SIP 200 OK message to the H_iGW in order to acknowledge the SIP NOTIFY and it returns an iDEN "Update Fleet Data ACK" to the Serving V_DAP. In step 21, upon receipt of the SIP 200 OK from the V_iGW, the H_iGW forwards an iDEN "Insert Fleet Data Ack" message to the subscriber iHLR.

In step 22, upon receipt of the "Insert Fleet Data Ack" the iHLR forwards an "Update Fleet Location Ack" message to the H_iGW. In one embodiment, the V_iGW (PiHLR responds with Ack to serving V DAP) and saving additional message between the H_iGW and the V_iGW with an Ack. Further, with in the SIP SUBSCRIBE message (for fleet objects) a subscription is requested for any event related to Update Fleet Location and the expiry timer is set.

Referring to FIG. 11*b*, in step 23 the Roaming Network "Serving" V_DAP forwards an iDEN "Update Individual Location" message to the V_iGW (PiHLR). The iDEN "Update Individual Location" message is used to update the CVLR field (Current VLR) of the subscriber's iHLR. In one embodiment, the iDEN Update Individual Location message includes the subscriber's IMSI and "Serving" DAP's IP Address.

In step 24, the V_iGW receives the "Update Individual Location" message and it sends a SIP REGISTER message to the subscriber's H_iGW. Prior to forwarding the "Update Individual Location" message to the H_iGW, the V_iGW updates it's Roaming Registration Cache table with the subscriber's IMSI, dummy UFMI and Serving DAP IP Address and then changes the "Serving" DAP IP Address in the "Update Individual Location" message to the V_iGWs 3G Signaling IP Address. In one embodiment, the SIP REGISTER message includes the Call iD field in the form IMSI@domainname and the expires field is set to a maximum value (i.e.: 136 years). The H_iGW acknowledges the SIP REGISTER message containing the "Update Individual Location" message by returning a SIP 200 OK to the V_iGW. Next, H_iGW sends SIP 200 OK message back to V_iGW completing the SIP REGISTER.

In step 25, prior to forwarding the "Update Individual Location" message to the subscriber iHLR, the H_iGW updates it's Roaming Registration Cache table with the subscriber's IMSI, dummy UFMI and Serving DAP IP Address (V_IGW 3G Signaling IP Address) and then changes the "Serving" DAP IP Address in the iDEN "Update Individual Location" message to the H_iGW's SaB (PDAP-iD). The subscriber's iHLR updates the Roaming iDEN Subscriber's CVLR field with the "Serving DAP" IP Address, which is the iGW SaB IP Address.

In step 26, the V_iGW sends a SIP SUBSCRIBE message to the subscriber H_iGW. In one embodiment, the SIP SUBSCRIBE message includes the SIP URI in the form Urban*Fleet@domainname, an iDEN Registration specific Event field (i.e. Insert Subscriber Data) and a limited Expire field (i.e. 15 secs). Upon receiving the SIP SUBSCRIBE message from the V_iGW, the H_iGW returns a SIP 200 OK to the V_iGW.

In step 27, the iHLR returns an "Insert Subscriber Data" message back to the H_iGW. In one embodiment, the iDEN "Insert Subscriber Data" message contains subscriber specific Dispatch and Packet Data information (IMSI, IMEI, SCCH Information, Urban ID, Fleet ID, Member ID, Dispatch Service Flag, PC Service Flag, CA Service Flag, MS Status Service Flags, Cross Fleet Service Flag, SDGC Service Flag, PC Priority, SDGC Priority, Emergency GC Service Flags, ISSEI Service Flag, GC Service Flag, Talkgroup/Mode List, PD Service Flag, PD Encryption parameters, PD Compression parameters, Mobile Node Restriction List, Host Domain Restriction List, WiDEN Service Flag, MN IP Address, HA IP Address, Mobile IP Security Parameter Index, Mobile IP Authentication Key, Browser Gateway Address, DNS Address, Dispatch Roaming Flag, Long Distance Dispatch Calling Flag, Home DAP). In one embodiment, as per standard iDEN Protocol, if the roaming subscriber was previously registered on different home network DAP, the iHLR sends "Cancel Location" message to the last serving home network DAP. The old serving H_DAP removes VLR information and acknowledges the Cancel Location message from iHLR.

In step 28, upon receiving of the iDEN "Insert Subscriber Data" message from the iHLR, the Subscriber's H_iGW updates it's Roaming Registration Cache table with the subscriber's UFMI (replace the dummy UFMI) and then sends a SIP NOTIFY message to the V_iGW. In one embodiment, the SIP NOTIFY message includes the SIP URI in the form IMSI@domainname, an iDEN Registration specific Event field (i.e.: Get DVLR/Subscriber Objects) and the Content fields containing the subscriber's Subscriber Objects.

In step 29, the V_iGW updates its Roaming Registration Cache table with the subscriber's UFMI (replace the dummy UFMI) and then forwards an iDEN "Insert Subscriber Data" message to the Roaming Network "Serving" V_DAP with the information that was obtained in the SIP NOTIFY message.

In step 30, the "Serving" V_DAP acknowledges the subscriber provisioning information and it sends an "Insert Subscriber Data Ack" destined for the iHLR via the V_iGW (PiHLR). In step 31, the V_iGW sends SIP 200 OK back to subscriber H_iGW simply acknowledging the SIP NOTIFY and Insert Subscriber Data Ack, which it received from serving V_DAP. In step 32, H-iGW sends "Insert Subscriber Data Ack" to subscriber iHLR.

In step 33, the Subscriber's iHLR acknowledges and sends an "Individual Location Update Ack" message to the H_iGW. The V_iGW forwards an "Update Individual Location Ack" message to the "Serving" V_DAP. In one embodiment, the V_iGW (PiHLR responds with Ack to serving V_DAP) and saving additional message between the H_iGW and the V_iGW with a simple Ack. Further, within the SIP SUBSCRIBE message (for subscriber objects) a subscription is requested for any event related to Update Subscriber Location and the expiry timer is set. Next, as per standard iDEN Protocol, the "Serving" V_DAP forwards an iDEN "Registration Accept" message to the Roaming Subscriber via the ACG.

Roaming Registration between Peer iDEN Networks
Fourth Embodiment

Figure 12A:
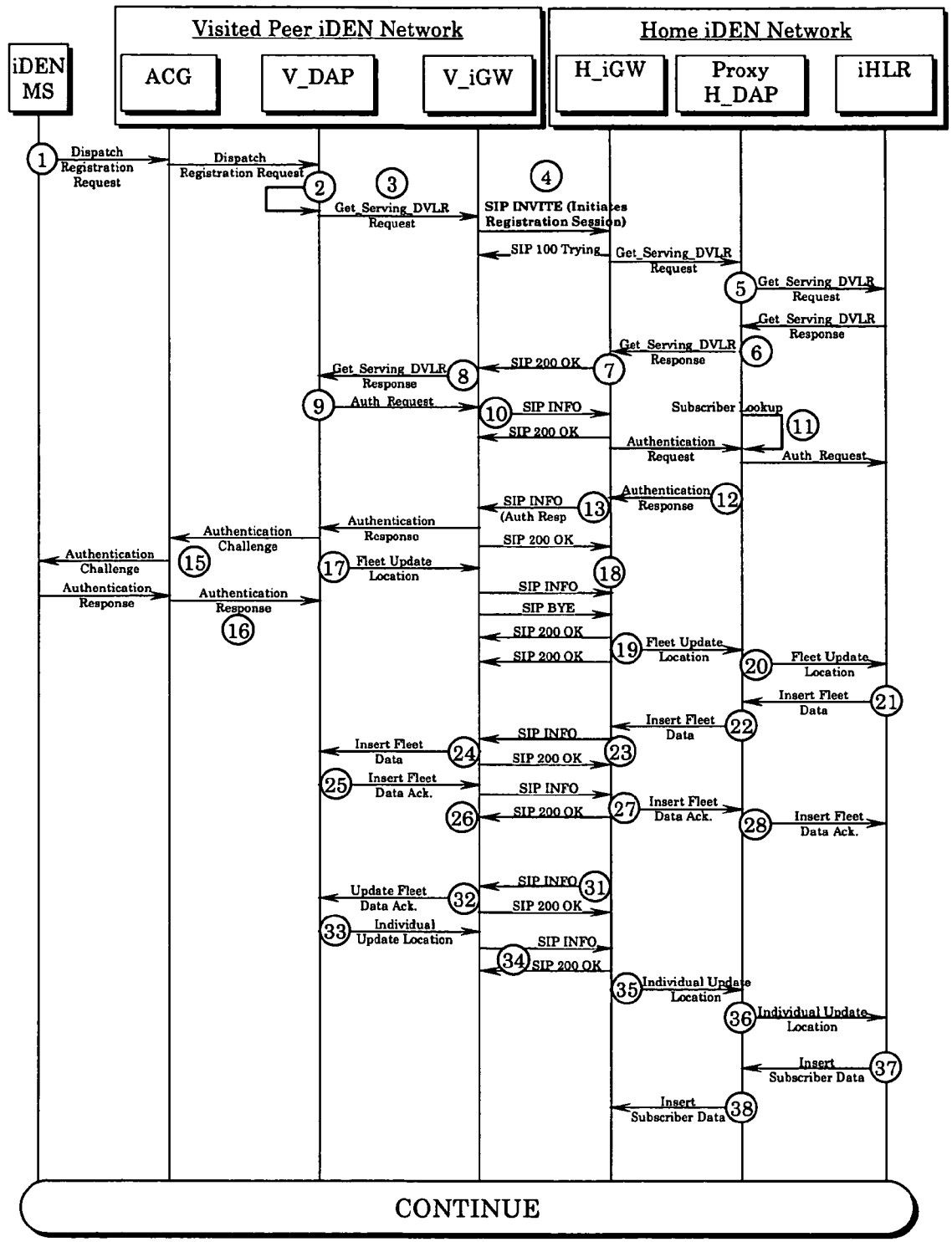
FIGS. 12a and 12b illustrate signaling for roaming registration between peer iDEN networks via the iGW in accordance with a fourth exemplary embodiment of the present invention.
Figure 12B:
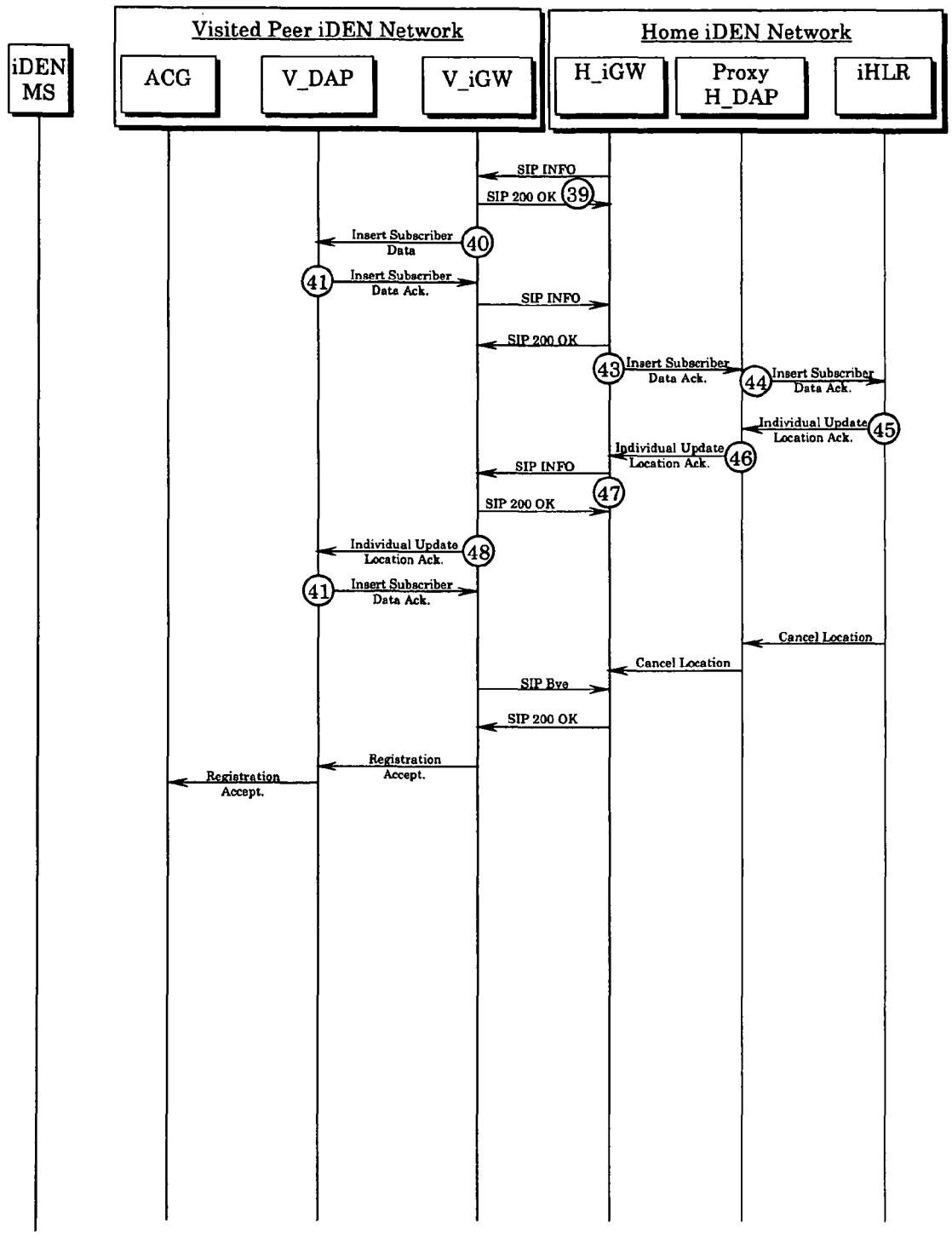

FIGS. 12*a* and 12*b* illustrate a fourth embodiment of signaling for roaming registration between peer iDEN networks via an iGW. In accordance with this embodiment, a SIP INVITE message is used to initiate the registration session between iGW(s), as all the iDEN Registration messages are tunneled across two iGW. Once the registration process completes, the registration session will be terminated. This embodiment takes advantage of the full mesh network on the iDEN side, by allowing the iGW to perform a "dumb forward" to any DAP (Proxy DAP) in the subscriber's Home Network, and the Proxy DAP queries the iHLR for the subscriber's information. The signaling will now be described with reference to FIGS. 12*a* and 12*b*.

Referring to FIG. 12*a*, in step 1 as per standard iDEN protocol, the ACG in the Roaming iDEN Network forwards the Dispatch Registration Request from the Nextel MS to the "Picked DAP" in the Roaming iDEN Network.

In step 2, the "Picked V_DAP" performs a GTT Lookup on the subscriber's IMSI. In one embodiment, the subscriber's IMSI points to the V_iGW P-iHLR. In step 3, the "Picked V_DAP" sends a "Get Serving DVLR Request" to the V_iGW (P-iHLR). In step 4, the V_iGW receives the "Get Serving DVLR Request" and performs a GTT Lookup of the subscriber's IMSI to determine the subscriber's Home IAS (i.e., H_iGW). The V_iGW initiates registration session by sending a SIP INVITE message containing the iDEN "Get Serving DVLR Request" that is destined for the subscriber's iHLR to the subscriber's H_iGW. Upon receipt of the SIP INVITE message, the H_iGW will send a SIP 100 TRYING back to V_iGW.

In step 5, the subscriber's H_iGW receives the SIP INVITE message (Get Serving DVLR Request), and selects a Proxy H_DAP to forward the "Get Serving DVLR Request." The Proxy H_DAP receives the "Get Serving DVLR Request" from the H_iGW and performs a GTT Lookup on the subscriber's IMSI to determine the subscriber's iHLR. The Proxy H_DAP forwards the "Get Serving DVLR Request" to the subscriber's iHLR. In step 6, the subscriber's iHLR receives the "Get Serving DVLR Request" from the Proxy H DAP and returns a "Get Serving DVLR Response" back to the Proxy H_DAP. As per standard iDEN Protocol, the "Get_Serving DVLR Response" includes the subscriber's Serving DAP iD (IP Address). H_DAP forwards that response to H_iGW.

In step 7, subscriber H_iGW sends SIP 200 OK message that contains "Get_ServingDVLR Response" to V_iGW. In step 8, upon receipt of the SIP 200 OK message (Get Serving DVLR Response), the V_iGW forwards the "Get_Serving DVLR Response" to the V_DAP (i.e., the Picked DAP). In step 9, as per standard iDEN Protocol, the V_DAP sends an Authentication Request to the V_iGW, (PiHLR) in order to obtain the subscriber's Authentication triplets.

In step 10, the V_iGW receives the "Authentication Request" and performs GTT Lookup of the subscriber IMSI to determine the subscriber's Home IAS i.e., H_iGW. The V_iGW sends SIP INFO message to subscriber H_iGW that is destined for subscriber iHLR. Upon receipt of SIP INFO (Authentication Request) from the V_iGW, the H_iGW responds with SIP 200 OK message to acknowledge that the INFO was received successfully. The subscriber's H_iGW selects a Proxy H_DAP to forward the iDEN "Authentication Request."

In step 11, the Proxy H_DAP receives the iDEN "Authentication Request" and performs a GTT Lookup on the subscriber's IMSI to determine the subscriber's iHLR. The Proxy H_DAP forwards the "Authentication Request" to the subscriber's iHLR. In step 12, the subscriber's iHLR receives the iDEN "Authentication Request" from the selected DAP and returns an iDEN "Authentication Response" back to the selected DAP, where the iDEN "Authentication Response" includes the subscriber's Authentication triplets (i.e., Cipher Key Sequence Number, Random Number, Signed Response.). Upon receipt of the iHLR's "Authentication Response," the Proxy H_DAP forwards the "Authentication Response" to the H_iGW.

In step 13, the Subscriber's H_iGW sends a SIP INFO message to the V_iGW. The SIP INFO message includes the iDEN "Authentication Response" that was received from the Proxy H_DAP. Upon receiving SIP INFO, V_iGW sends SIP 200 OK back to V_iGW. In step 14, the V_iGW forwards the "Authentication Response" to the "Serving" V_DAP. In step 15, upon receipt of the Authentication Sets, the Roaming Network "Serving" V_DAP attempts to authenticate the subscriber via an iDEN "Authentication Challenge" message to the ACG.

In step 16, the "Serving" V_DAP receives the subscriber's authentication response via the ACG. In one embodiment, Steps 17-32, which involve the iDEN "Update Fleet Location" messaging, are only performed if the iDEN Subscriber is the first subscriber from its fleet to roam into the Visiting Network's DAP, otherwise the iDEN "Update Individual Location" message is sent by the "Serving" V_DAP destined for the subscriber's iHLR.

In step 17, upon successful authentication of the roaming subscriber the "Serving" V_DAP forwards to the V_iGW (PiHLR) an iDEN "Update Fleet Location" Message. In step 18, the V_iGW receives the "Update Fleet Location" message and it sends a SIP INFO message to the subscriber's H_iGW, including the iDEN "Update Fleet Location" message that is destined for the subscriber's iHLR. Upon receiving the SIP INFO message from V_iGW, the H_iGW returns a SIP 200 OK to the V_iGW to acknowledge that the INFO was received successfully. In one embodiment, the iDEN Update Fleet Location message includes the subscriber's Urban and Fleet iD, and Serving DAP IP Address.

In step 19, the subscriber's H_iGW receives the SIP INFO message (Update Fleet Location), and forwards the "Update Fleet Location" message to the Proxy H_DAP. In step 20, the Proxy H_DAP receives the "Update Fleet Location" message and forwards the "Update Fleet Location" message to the subscriber's iHLR. In step 21, the subscriber's iHLR receives the "Update Fleet Location" message from the Proxy H_DAP and the iHLR updates its database with the Update Fleet Location message and returns an iDEN "Insert Fleet Data" message back to the Proxy H_DAP. In one embodiment, the iDEN "Insert Fleet Data" message includes information specific to the subscriber's fleet (i.e., Urban ID, Fleet ID, SCCH Information, Home Cell, Home DAP, Talkgroup Objects (Talkgroup ID, Dispatcher ID, PTT ID Flag, Talkgroup Priority, Home Cell), and Mode Objects (for MSTG: Mode ID, Primary Talkgroup ID, Secondary Talkgroup IDs)).

In step 22, upon receipt of the iHLR's iDEN "Insert Fleet Data" message, the Proxy H_DAP forwards the "Insert Fleet Data" message to the H_iGW. In step 23, the Subscriber's H_iGW sends a SIP INFO message to the V_iGW. The SIP INFO message includes the iDEN "Insert Fleet Data" message that was received from the Proxy H_DAP. The V_iGW sends SIP 200 OK to H-iGW in response to SIP INFO, to acknowledge that the INFO was received successfully. In step 23, the V_iGW forwards the iDEN "Insert Feet Data" message to the "Serving" V_DAP.

In step 24, as per standard iDEN Protocol, the "Serving" V_DAP acknowledges the iDEN "Insert Fleet Data" message with an "Insert Fleet Data Ack" message that is destined to the subscriber's iHLR via the V_iGW. In step 25, the V_iGW sends a SIP INFO message that includes "Insert Fleet Data Ack" to the subscriber's H_iGW, and the H_iGW sends a SIP 200 back to the V_iGW in response to the SIP INFO message containing the "Insert Fleet Data Ack." In step 26, the subscriber's H_iGW forwards the "Insert Fleet Data Ack" message to the Proxy H_DAP.

In step 27, the Proxy H_DAP forward the "Insert Fleet Data Ack" message to the subscriber's iHLR. In step 28, upon receipt of the "Insert Fleet Data Ack" the iHLR forwards an "Update Fleet Location Ack" message to the Proxy H_DAP. In step 29, the Proxy H_DAP forwards the "Update Fleet Location Ack" message to the H_iGW. In step 30, the Subscriber's H_iGW sends a SIP INFO message to the V_iGW. The SIP INFO message includes the iDEN "Update Fleet Location Ack" message that was received from the Proxy H_DAP, V_iGW sends SIP 200 OK message back to H_iGW to acknowledge that the INFO was received.

In step 31, upon receipt of the SIP INFO message, the V_iGW forwards the "Update Fleet Location Ack" message to the Roaming Network "Serving" V_DAP. In step 32, the Roaming Network "Serving" V_DAP forwards an "Update Individual Location" message to the V_iGW (PiHLR). The "Update Individual Location" message updates the CVLR field (Current VLR) of the subscriber's iHLR. In one embodiment, the iDEN Update Individual Location message includes the subscriber's IMSI and "Serving" DAP's IP Address.

In step 33, the V_iGW receives the "Update Individual Location" message and it sends a SIP INFO message to the subscriber's H_iGW. In step 34, prior to forwarding the "Update Individual Location" message to the H_iGW, the V_iGW updates it's Roaming Registration Cache table with the subscriber's IMSI, dummy UFMI and Serving DAP IP Address and then changes the "Serving" DAP IP Address in the "Update Individual Location" message to the V_iGW's 3G Signaling IP Address. The subscriber H_iGW acknowledges the SIP INFO message including the "Update Individual Location" message by returning a SIP 200 OK to the V_iGW.

In step 35, prior to forwarding the "Update Individual Location" message to the Proxy H_DAP, the H_iGW updates it's Roaming Registration Cache table with the subscriber's IMSI, dummy UFMI and Serving DAP IP Address (ViGW 3G Signaling IP Address) and then changes the "Serving" DAP IP Address in the "Update Individual Location" message to the H_iGW's SaB (PDAP-iD). The Proxy H_DAP receives the "Update Individual Location" message and it performs a GTT Lookup on the subscriber's IMSI to determine the subscriber's iHLR.

In step 36, the Proxy H_DAP forwards the "Update Individual Location" message to the subscriber's iHLR. In step 37, the subscriber's iHLR updates the Roaming iDEN Subscriber's CVLR field with the "Serving DAP" IP Address, which is the iGW SaB IP Address in one embodiment. The iHLR returns an "Insert Subscriber Data" message back to the Proxy H_DAP. In one embodiment, the iDEN "Insert Subscriber Data" message includes subscriber specific Dispatch and Packet Data information such as IMSI, IMEI, SCCH Information, Urban ID, Fleet ID, Member ID, Dispatch Service Flag, PC Service Flag, CA Service Flag, MS Status Service Flags, Cross Fleet Service Flag, SDGC Service Flag, PC Priority, SDGC Priority, Emergency GC Service Flags, ISSEI Service Flag, GC Service Flag, Talkgroup/Mode List, PD Service Flag, PD Encryption parameters, PD Compression parameters, Mobile Node Restriction List, Host Domain Restriction List, WiDEN Service Flag, MN IP Address, HA IP Address, Mobile IP Security Parameter Index, Mobile IP Authentication Key, Browser Gateway Address, DNS Address, Dispatch Roaming Flag, Long Distance Dispatch Calling Flag, Home DAP. In one embodiment, as per standard iDEN Protocol, if the roaming subscriber was previously registered on different home network DAP, the iHLR sends "Cancel Location" message to the last serving home network DAP. Old serving H_DAP removes VLR information and acknowledges the Cancel Location message from iHLR.

In step 38, upon receipt of the iHLR's "Insert Subscriber Data" message, the Proxy H_DAP forwards the iDEN "Insert Subscriber Data" message to the H_iGW. In step 39, upon receipt of the iDEN "Insert Subscriber Data" message from the Proxy H-DAP, the Subscriber's H_iGW updates it's Roaming Registration Cache table with the subscriber's UFMI (replace the dummy UFMI) and then sends a SIP INFO message to the V_IGW, which includes the "Insert Subscriber Data" message that was received from the Proxy H_DAP. Upon receipt of the SIP INFO "Insert Subscriber Data" message, the V_iGW sends a SIP 200 OK message back to H_iGW to acknowledge that the INFO was received successfully.

In step 40, the V_iGW updates its Roaming Registration Cache table with the subscriber's UFMI (replace the dummy UFMI) and then forwards the "Insert Subscriber Data" message to the Roaming Network "Serving" V_DAP. In step 41, the "Serving" V_DAP acknowledges the subscriber provisioning information and it sends an "Insert Subscriber Data Ack" destined for the iHLR via the V_iGW (PiHLR).

In step 42, the V_iGW sends SIP INFO message that contains the "Insert Subscriber Data Ack" to the H_iGW, and the H_iGW responds back with a SIP 200 OK message. In step 43, the Subscriber H_iGW receives the "Insert Subscriber Data Ack" via SIP INFO from the V_iGW, and the H_iGW forwards the "Insert Subscriber Data Ack" to the Proxy H_DAP.

In step 44, the Proxy H_DAP forwards the "Insert Subscriber Data Ack" to the iHLR. In step 45, the Subscriber's iHLR acknowledges the Proxy H_DAP, and the iHLR sends an "Individual Location Update Ack" message to the Proxy H_DAP. In step 46, the Subscriber's Home Network Proxy H_DAP forwards an "Update Individual Location Ack" message to the H_iGW.

In step 4r7, the H_iGW sends SIP INFO (Update Individual Location Ack) to V_iGW and V_iGW responds with SIP 200 OK message back to H_iGW to acknowledge that INFO was received successfully. In step 48, the V_iGW forwards an "Update Individual Location Ack" message to the "Serving" V_DAP. At this point as per standard iDEN Protocol, the "Serving" V_DAP forwards an iDEN "Registration Accept" message to the Roaming Subscriber via the ACG.

Roaming Registration between Peer iDEN Networks
Fifth Embodiment

Figure 13A:
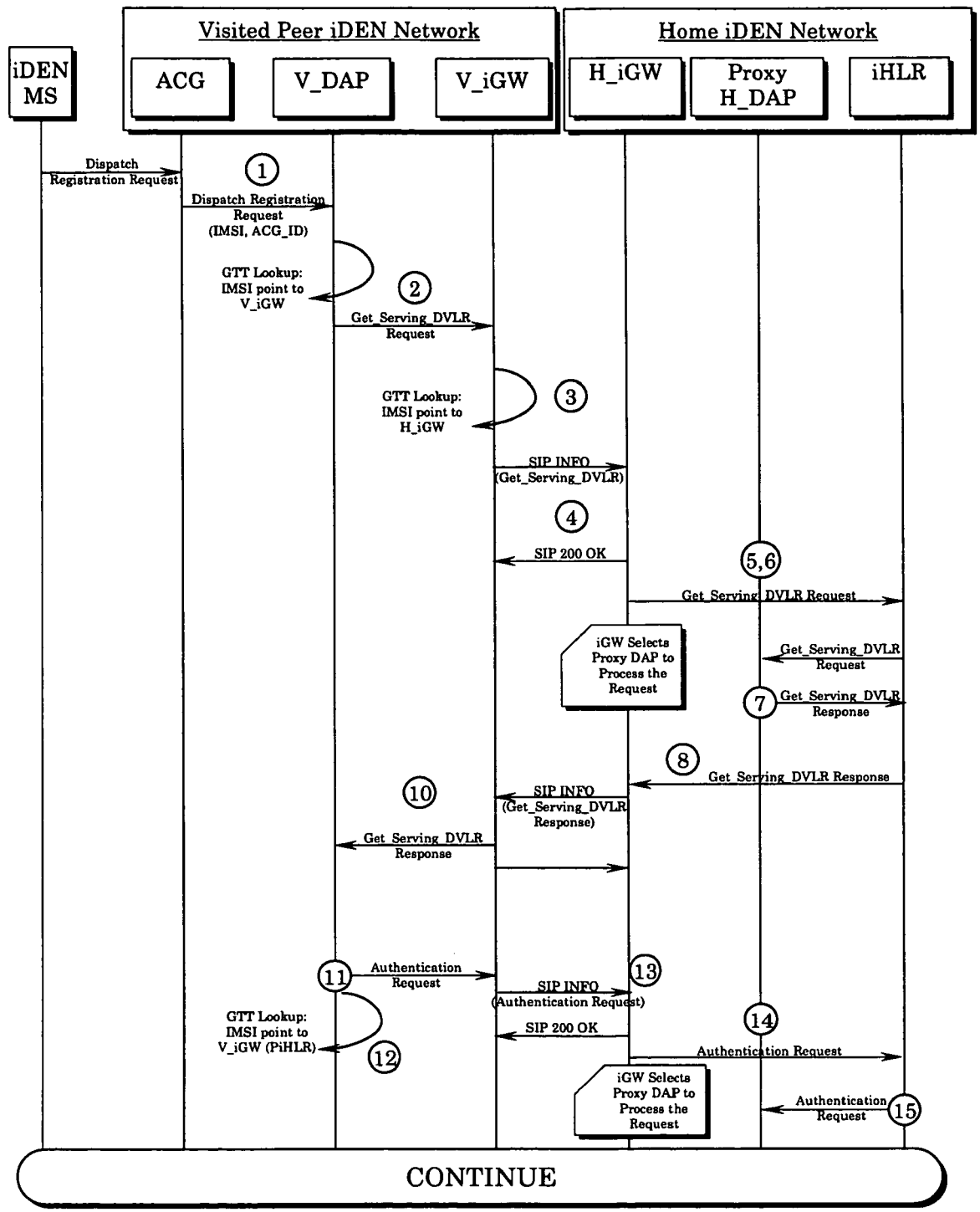
FIGS. 13a-c illustrate signaling for roaming registration between peer iDEN networks via the iGW in accordance with a fifth exemplary embodiment of the present invention.
Figure 13B:
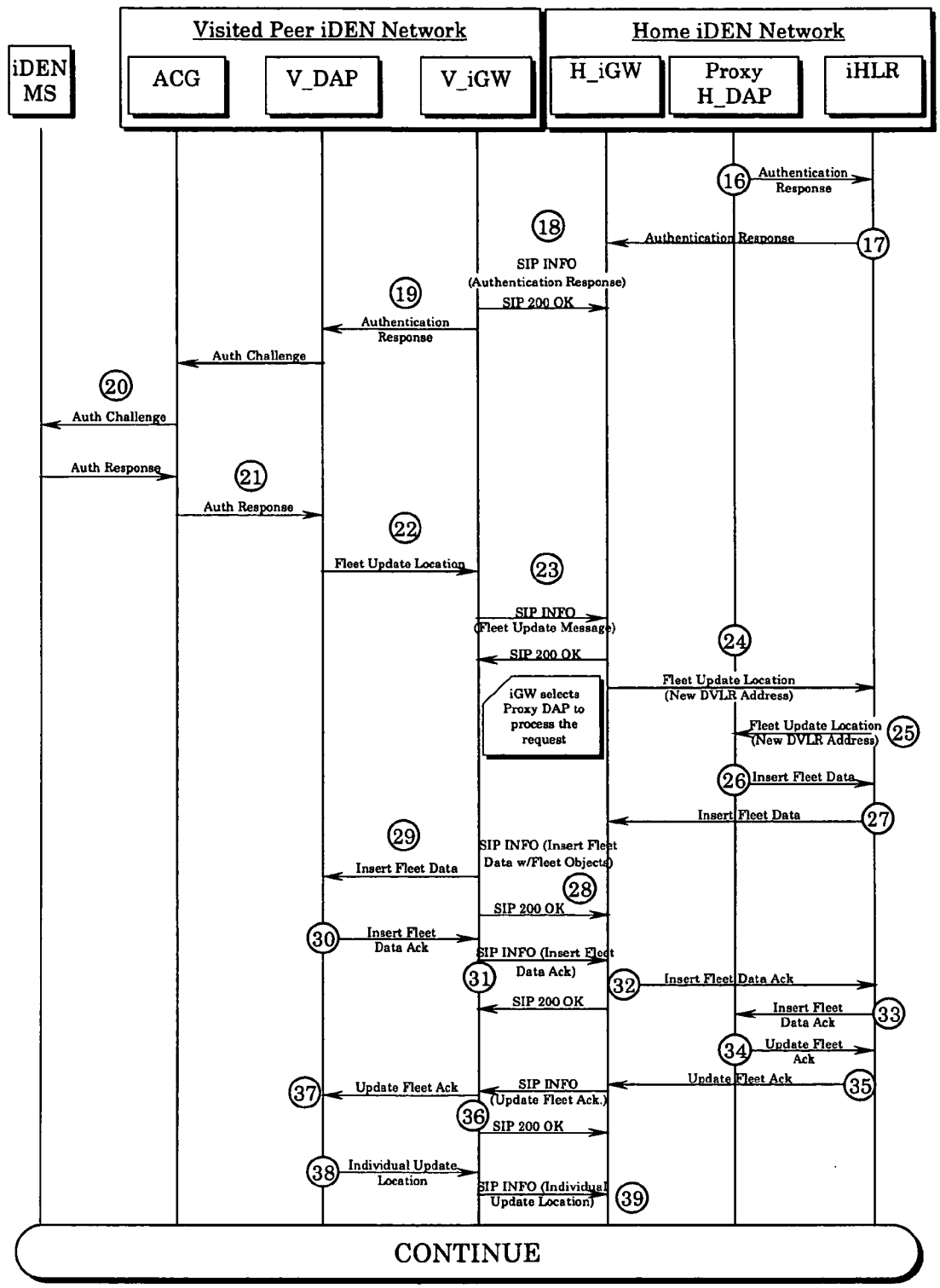
Figure 13C:
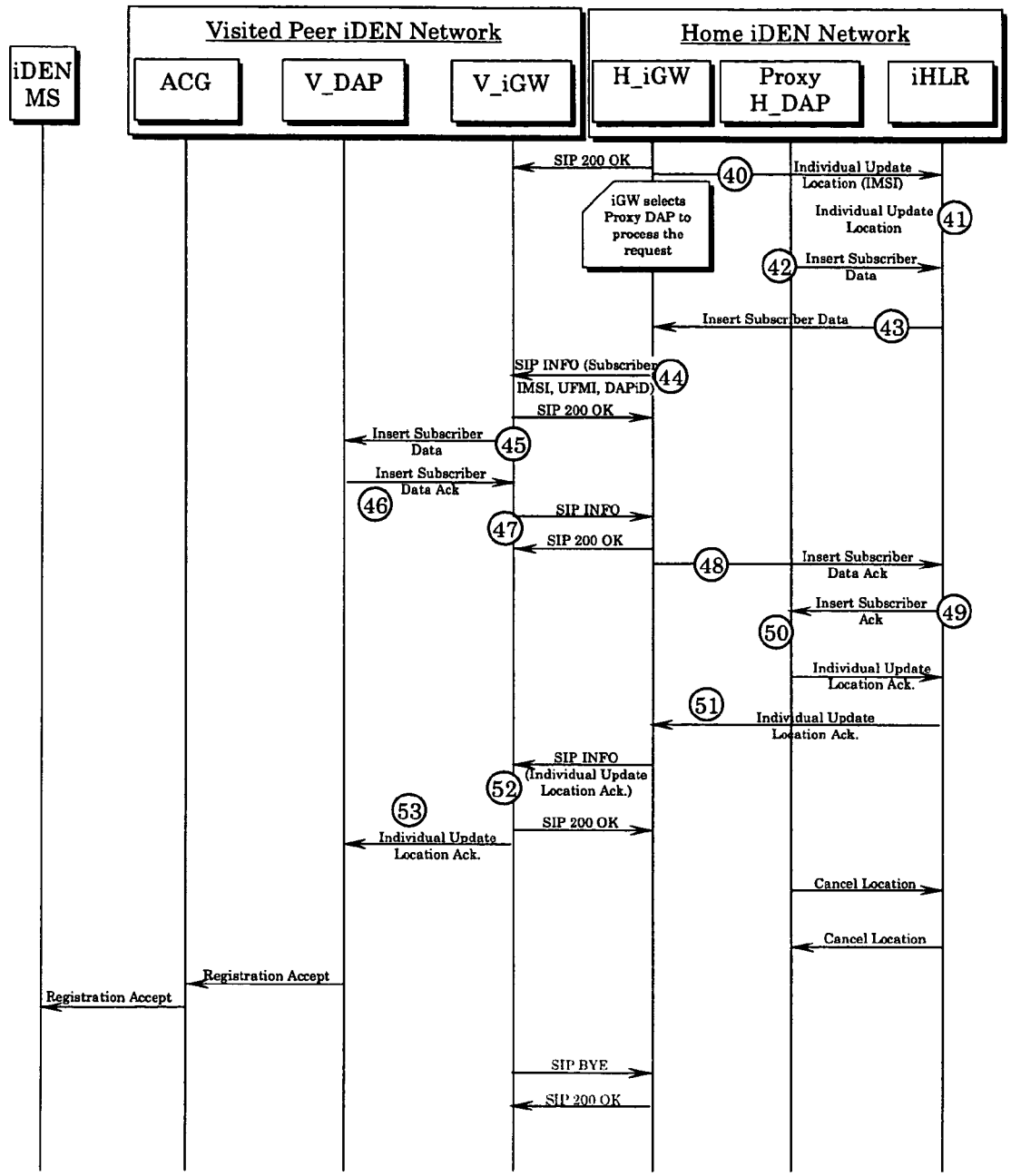

FIGS. 13a-c illustrate signaling for roaming registration between peer iDEN networks via an iGW in accordance with a fifth exemplary embodiment of the present invention. In accordance with this embodiment, SIP INFO is used to transport iDEN Registration messages between iDEN Networks. This embodiment takes advantage of the full mesh network on the iDEN side, by allowing the iGW to perform a "dumb forward" to any DAP (Proxy DAP) in the subscriber's Home Network, and the Proxy DAP queries the iHLR for the subscriber's information. The signaling will now be described with reference to FIGS. 13a-c.

Referring to FIG. 13a, in step 1 as per standard iDEN protocol, The ACG in the Roaming iDEN Network forwards the Dispatch Registration Request from the Roaming MS to the "Picked DAP" in the Roaming iDEN Network.

In step 2, the "Picked V_DAP" performs a GTT Lookup on the subscriber's IMSI. In one embodiment, the subscriber's IMSI points to the V_iGW's P-iHLR. The "Picked V_DAP" sends a "Get Serving DVLR Request" to the V_iGW (P-iHLR). As per standard iDEN Protocol, the "Get Serving DVLR Request" includes the Roaming Subscriber's IMSI. In current iDEN networks, the default timer value for the "Get Serving DVLR Response" is 5 seconds.

In step 3, the V_iGW receives the "Get Serving DVLR Request" and it performs a GTT Lookup of the subscriber's IMSI to determine the subscriber's Home IAS (i.e., H_iGW). In step 4, the V_iGW sends a SIP INFO message containing the iDEN "Get Serving DVLR Request" that is destined for the subscriber's iHLR to the subscriber's H_iGW. Upon receipt of the SIP INFO message, the H_iGW sends a SIP 200 OK back to V_iGW to acknowledge that INFO was received successfully.

In step 5, the subscriber's H_iGW receives the SIP INFO message (Get Serving DVLR Request), and it selects a Proxy H_DAP to forward the "Get Serving DVLR Request." In step 6, the Proxy H_DAP receives the "Get Serving DVLR Request" from the H_iGW and the Proxy H_DAP performs a GTT Lookup on the subscriber's IMSI to determine the subscriber's iHLR. The Proxy H_DAP forwards the "Get Serving DVLR Request" to the subscriber's iHLR.

In step 7, the subscriber's iHLR receives the "Get Serving DVLR Request" from the Proxy H_DAP and it returns a "Get Serving DVLR Response" back to the Proxy H_DAP. In one embodiment, the subscriber is the first unit from its fleet to roam onto the Roaming iDEN Network; therefore the Picked DAP will become the Serving DAP. If the Picked DAP is not the subscriber's Serving DAP, then as per standard iDEN Protocol, the Picked DAP would forward the Dispatch Registration to the Serving DAP that was identified in the "Get_Serving DVLR Response." In step 8, upon receipt of the iHLR's "Get Serving DVLR Response," the Proxy H_DAP forwards the "Get_Serving DVLR Response" to the H_iGW.

In step 9, the Subscriber's H_iGW sends a SIP INFO message to the V_iGW. The SIP INFO message contains the iDEN "Get_Serving DVLR Response" that was received from the Proxy H_DAP. In step 10, upon receipt of the SIP INFO message (Get Serving DVLR Response), the V_iGW forwards the "Get_Serving DVLR Response" to the V_DAP (i.e., the Picked DAP).

In step 11, as per standard iDEN Protocol, the "Serving" V_DAP sends an Authentication Request to the V_iGW (P-iHLR), in order to obtain the subscriber's Authentication triplets. In one embodiment, the default timer value in an iDEN network for the "Authentication Response" is 10 seconds. In step 12, V_iGW receives the "Authentication Request" and it performs a GTT Lookup of the subscriber's IMSI to determine the subscriber's Home IAS (i.e., H_iGW).

In step 13, the V_iGW sends a SIP INFO message to the subscriber's H_iGW. The SIP INFO message contains the iDEN "Authentication Request" that is destined for the subscriber's iHLR. Upon receiving SIP INFO message, the H_iGW sends a SIP 200 OK back to V_iGW to acknowledge that INFO was received successfully. In step 14, the subscriber's H_iGW selects a Proxy H_DAP to forward the iDEN "Authentication Request" to the subscriber's iHLR. In step 15, the Proxy H_DAP receives the "Authentication Request" from the H_iGW and the Proxy H_DAP forwards the "Authentication Request" to the subscriber's iHLR (via GTT Lookup).

In step 16, the subscriber's iHLR receives the iDEN "Authentication Request" from the Proxy H_DAP, and the iHLR returns an iDEN "Authentication Response" back to the Proxy H_DAP, where the iDEN "Authentication Response" contains the subscriber's Authentication triplets (i.e., Cipher Key Sequence Number, Random Number, Signed Response.) In step 17, upon receipt of the iHLR's "Authentication Response," the Proxy H_DAP forwards the "Authentication Response" to the H_iGW.

In step 18, the Subscriber's H_iGW sends a SIP INFO message to the V_iGW. The SIP INFO message contains the iDEN "Authentication Response" that was received from the Proxy H_DAP. Upon receiving SIP INFO message, the V_iGW sends a SIP 200 OK back to the V_iGW. In step 19, the V_iGW forwards the "Authentication Response" to the "Serving" V_DAP. In step 20, upon receipt of the Authentication Sets, the Roaming Network "Serving" V_DAP attempts to authenticate the subscriber via an iDEN "Authentication Challenge" message to the ACG. In step 21, the "Serving" V_DAP receives the subscriber's authentication response via the ACG.

Steps 22-37, which involve the iDEN "Update Fleet Location" messaging, are only implemented if the iDEN Subscriber is the first subscriber from its fleet to roam into the Visiting Network's DAP, otherwise the iDEN "Update Individual Location" message will be sent by the "Serving" V_DAP destined for the subscriber's iHLR (see Step 38)

In step 22, upon successful authentication of the roaming subscriber the "Serving" V_DAP forwards to the V_iGW (PiHLR) an iDEN "Update Fleet Location" Message In step 23, the V_iGW receives the "Update Fleet Location" message and it sends a SIP INFO message to the subscriber's H_iGW, containing the iDEN "Update Fleet Location" message that is destined for the subscriber's iHLR. Upon receiving the SIP INFO message from V_iGW, the H_iGW returns a SIP 200 OK to the V_iGW to acknowledge that INFO was received. In one embodiment, the iDEN Update Fleet Location message includes the subscriber's Urban and Fleet iD, and Serving DAP IP Address. For iHLR, serving DAP IP address is the H_iGW SaB IP address.

In step 24, the subscriber's H_iGW receives the SIP INFO message (Update Fleet Location), and forwards the "Update Fleet Location" message to the Proxy H_DAP.

In step 25, the Proxy H_DAP receives the "Update Fleet Location" message and it forwards the "Update Fleet Location" message to the subscriber's iHLR. In step 26, the subscriber's iHLR receives the "Update Fleet Location" message from the Proxy H_DAP and the iHLR updates its database with the Update Fleet Location message and returns an iDEN "Insert Fleet Data" message back to the Proxy H_DAP. In one embodiment, the iDEN "Insert Fleet Data" message contains information specific to the subscriber's fleet (i.e., Urban ID, Fleet ID, SCCH Information, Home Cell, Home DAP, Talkgroup Objects (Talkgroup ID, Dispatcher ID, PTT ID Flag, Talkgroup Priority, Home Cell), and Mode Objects (for MSTG: Mode ID, Primary Talkgroup ID, Secondary Talkgroup IDs)).

In step 27, upon receipt of the iHLR's iDEN "Insert Fleet Data" message, the Proxy H_DAP forwards the "Insert Fleet Data" message to the H_iGW. In step 28, the Subscriber's H_iGW will send a SIP INFO message to the V_iGW. The SIP INFO message contains the iDEN "Insert Fleet Data" message that was received from the Proxy H_DAP. V_iGW sends SIP 200 OK to H-iGW in response to SIP INFO to acknowledge that the INFO was received. In step 29, the V_iGW forwards the iDEN "Insert Feet Data" message to the "Serving" V DAP.

In step 30, as per standard iDEN Protocol, the "Serving" V_DAP acknowledges the iDEN "Insert Fleet Data" message with an "Insert Fleet Data Ack" message that is destined to the subscriber's iHLR via the V_iGW. In step 31, the V_iGW sends a SIP INFO message that contains "Insert Fleet Data Ack" to the subscriber's H_iGW, and the H_iGW sends a SIP 200 back to the V_GW in response to the SIP INFO message containing the "Insert Fleet Data Ack."

In step 32, the subscriber's H_iGW forwards the "Insert Fleet Data Ack" message to the Proxy H_DAP. In step 33, the Proxy H_DAP forwards the "Insert Fleet Data Ack" message to the subscriber's iHLR. In step 34, upon receipt of the "Insert Fleet Data Ack" the iHLR forwards an "Update Fleet Location Ack" message to the Proxy H_DAP. In step 35, the Proxy H_DAP forwards the "Update Fleet Location Ack" message to the H_iGW.

In step 36, the Subscriber's H_iGW sends a SIP INFO message to the V_iGW. The SIP INFO message contains the iDEN "Update Fleet Location Ack" message that was received from the Proxy H_DAP, V_iGW sends SIP 200 OK message back to H_iGW to acknowledge that the INFO was received successfully.

In step 37, upon receipt of the SIP INFO message, the V_iGW forwards the "Update Fleet Location Ack" message to the Roaming Network "Serving" V_DAP. In step 38, the Roaming Network "Serving" V_DAP forwards an "Update Individual Location" message to the V_iGW (PiHLR). The "Update Individual Location" message is used to update the CVLR field (Current VLR) of the subscriber's iHLR. In one embodiment, the iDEN Update Individual Location message includes the subscriber's IMSI and "Serving" DAP's IP Address.

In step 39, the V_iGW receives the "Update Individual Location" message and it sends a SIP INFO message to the subscriber's H_iGW. Prior to forwarding the "Update Individual Location" message to the H_iGW, the V_iGW updates it's Roaming Registration Cache table with the subscriber's IMSI, dummy UFMI and Serving DAP IP Address and then change the "Serving" DAP IP Address in the "Update Individual Location" message to the V_iGW's 3G Signaling IP Address. The subscriber H_iGW acknowledges the SIP INFO message containing the "Update Individual Location" message by returning a SIP 200 OK to the V_iGW.

In step 40, prior to forwarding the "Update Individual Location" message to the Proxy H_DAP, the H_iGW updates it's Roaming Registration Cache table with the subscriber's IMSI, dummy UFMI and Serving DAP IP Address (ViGW 3G Signaling IP Address) and then changes the "Serving" DAP IP Address in the "Update Individual Location" message to the H_iGW's SaB (PDAP-iD). The Proxy H_DAP receives the "Update Individual Location" message and it performs a GTT Lookup on the subscriber's IMSI to determine the subscriber's iHLR.

In step 41, the Proxy H_DAP forwards the "Update Individual Location" message to the subscriber's iHLR. In step 42, the subscriber's iHLR updates the Roaming iDEN Subscriber's CVLR field with the "Serving DAP" IP Address, which is the iGW SaB IP Address. The iHLR returns an "Insert Subscriber Data" message back to the Proxy H_DAP.

In one embodiment, the iDEN "Insert Subscriber Data" message includes subscriber specific Dispatch and Packet Data information such as IMSI, IMEI, SCCH Information, Urban ID, Fleet ID, Member ID, Dispatch Service Flag, PC Service Flag, CA Service Flag, MS Status Service Flags, Cross Fleet Service Flag, SDGC Service Flag, PC Priority, SDGC Priority, Emergency GC Service Flags, ISSEI Service Flag, GC Service Flag, Talkgroup/Mode List, PD Service Flag, PD Encryption parameters, PD Compression parameters, Mobile Node Restriction List, Host Domain Restriction List, WiDEN Service Flag, MN IP Address, HA IP Address, Mobile IP Security Parameter Index, Mobile IP Authentication Key, Browser Gateway Address, DNS Address, Dispatch Roaming Flag, Long Distance Dispatch Calling Flag, Home DAP.

In another embodiment, as per standard iDEN Protocol, if the roaming subscriber was previously registered on different home network DAP, the iHLR sends "Cancel Location" message to the last serving home network DAP. Old serving H_DAP removes VLR information and acknowledges the Cancel Location message from iHLR.

In step 43, upon receipt of the iHLR's "Insert Subscriber Data" message, the Proxy H_DAP forwards the iDEN "Insert Subscriber Data" message to the H_iGW.

In step 44, upon receipt of the iDEN "Insert Subscriber Data" message from the Proxy H-DAP, the Subscriber's H_iGW updates it's Roaming Registration Cache table with the subscriber's UFMI (replace the dummy UFMI) and then sends a SIP INFO message to the V_iGW, which includes the "Insert Subscriber Data" message that was received from the Proxy H_DAP. Upon receipt of the SIP INFO "Insert Subscriber Data" message, the V_iGW sends a SIP 200 OK message back to H_iGW to acknowledge that the INFO was received.

In step 45, the V_iGW updates its Roaming Registration Cache table with the subscriber's UFMI (replace the dummy UFMI) and then forwards the "Insert Subscriber Data" message to the Roaming Network "Serving" V_DAP. In step 46, the "Serving" V_DAP acknowledges the subscriber provisioning information and it sends an "Insert Subscriber Data Ack" destined for the iHLR via the V_iGW (PiHLR).

In step 47, the V_iGW sends SIP INFO message that includes the "Insert Subscriber Data Ack" to the H_iGW, and the H_iGW responds back with a SIP 200 OK message. In step 48, the Subscriber H_iGW receives the "Insert Subscriber Data Ack" via SIP INFO from the V_iGW, and the H_iGW forwards the "Insert Subscriber Data Ack" to the Proxy H_DAP.

In step 49, the Proxy H_DAP forwards the "Insert Subscriber Data Ack" to the iHLR. In step 50, the Subscriber's iHLR acknowledges the Proxy H_DAP, and the iHLR sends an "Individual Location Update Ack" message to the Proxy H_DAP. In step 51, the Subscriber's Home Network Proxy H_DAP forwards an "Update Individual Location Ack" message to the H_iGW.

In step 52, the H_iGW sends SIP INFO (Update Individual Location Ack) to V_iGW and V_iGW responds with SIP 200 OK message back to H_iGW to acknowledge that the INFO was received. In step 53, the V_iGW forwards an "Update Individual Location Ack" message to the "Serving" V_DAP. As per standard iDEN Protocol, the "Serving" V_DAP forwards an iDEN "Registration Accept" message to the Roaming Subscriber via the ACG.

Network Elements

Figure 14:
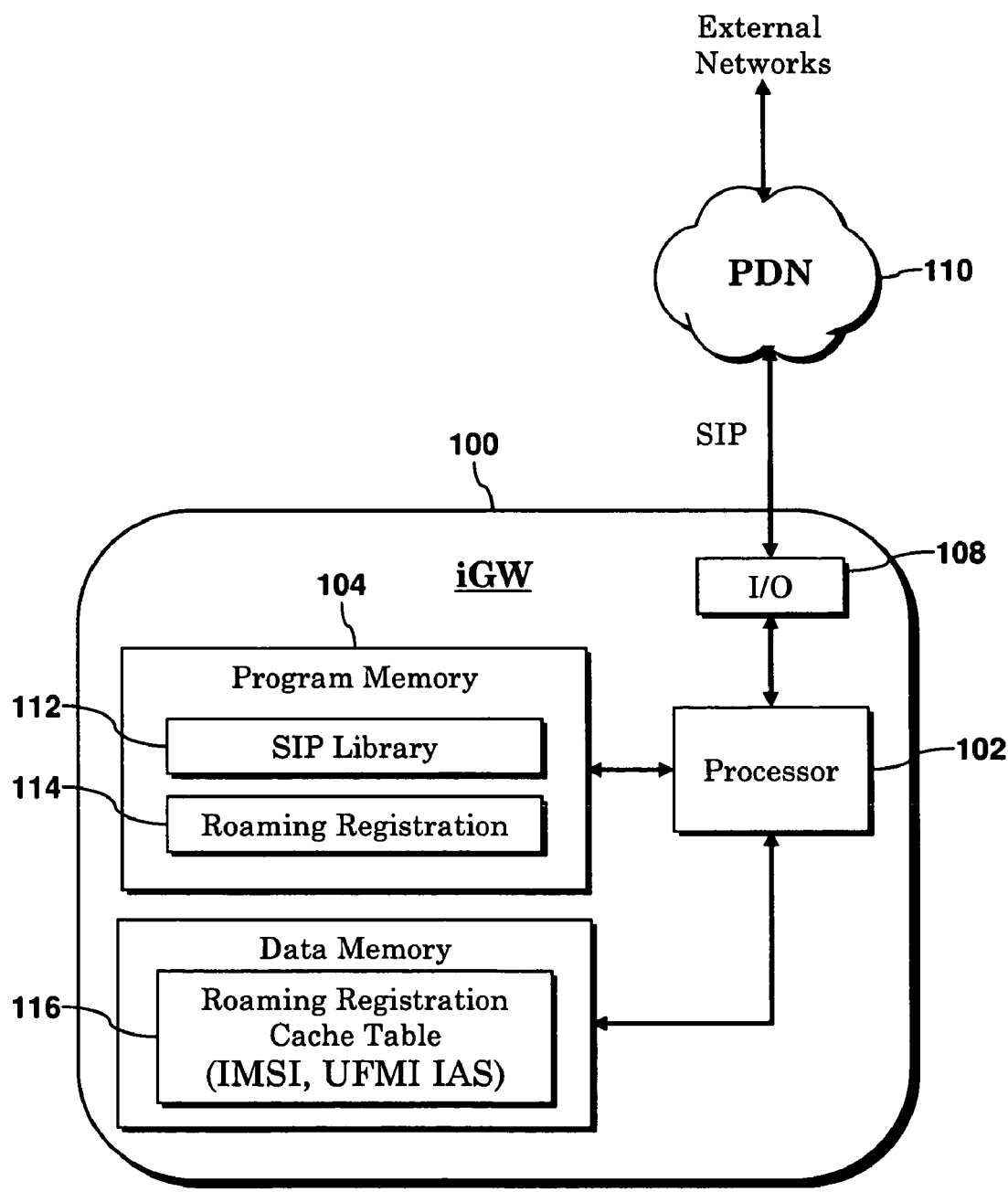
FIG. 14 illustrates an embodiment of an iGW in accordance with exemplary embodiments of the present invention.

Referring to FIG. 14, an embodiment of an iGW will be described. The iGW 100 includes a processor 102, a program memory 104, a data memory 106 and an input/output mechanism 108 providing communications with a packet data network 110 via SIP. The program memory 104 includes a SIP library 112 including program instructions for causing the processor to transmit, receive and process SIP messages, and a roaming registration application 114 for causing the processor 102 to perform the functions described herein.

The data memory 106 includes a cache memory table storing Roaming Registration information 116 (IMSI, UFMI and IAS), which would map an UFMI to an IAS and an UFMI to a DAP iD. The iGW may need to query the Roaming Registration cache after performing a standard cache look-up and before performing a GTT Lookup/iHLR Query. iDEN Originated Calls destined for the roaming iDEN Subscriber would be forwarded to the V_iGW. UFMI→← IAS mapping, where the IAS is the V_iGW. 3G Originated Calls destined for the iDEN Subscriber would be redirected by the H_iGW to the V_iGW. UFMI→← IAS mapping, where the IAS is the V_iGW (to be marked as "External").

In addition to implementing the signaling illustrated herein, the iGW may be further adapted to combine the Get_Serving_DVLR_Message and Authentication request into one SIP message. Another embodiment reduces the amount of SIP messaging between iGWs by having the Proxy H_DAP immediately respond to the iHLR with an "Insert Fleet Data Ack." The SIP 200 OK that is returned to the H_iGW after forwarding the "Insert Fleet Data" message to the V_iGW can be sufficient. As well, when the V_DAP sends the "Insert Fleet Data Ack", the V_iGW does not have to forward this message back to the H_iGW. Messaging may be further reduced between iGWs, by having the Proxy H_DAP immediately respond to the iHLR with an "Insert Subscriber Data Ack." The SIP 200 OK that is returned to the H_iGW after forwarding the "Insert Subscriber Data" message to the V_iGW can be sufficient. As well, when the V_DAP sends the "Insert Subscriber Data Ack," the V_iGW does not have to forward this message back to the H_iGW.

In one embodiment, the iHLR is modified to include a CVLR field to represent the H_iGW SaB (P-DAP iD). iDEN originated calls destined for the roaming iDEN subscriber would be forwarded to the stored H_iGW.

In one embodiment, the visited network includes a visited iGW having a cache mapping the iDEN user's UFMI to the roaming network serving V_DAP_iD. 3G Originated Calls destined for the iDEN Subscriber would be received by the V_iGW and forward to the DAP on the Roaming Network that is serving the target iDEN Subscriber (UFMI→← Roaming Network "Serving" V_DAP iD). Further, iDEN Originated Calls in the Roaming Network destined for the roaming iDEN Subscriber would be redirected by the V_iGW P-iHLR to the DAP on the Roaming Network that is serving the target iDEN Subscriber (UFMI→← Roaming Network "Serving" V_DAP iD) and marked as "Internal."

In one embodiment, if the roaming iDEN Subscriber is iDEN Packet Data capable then iDEN Packet Data Registration only involves the Roaming Network "Serving" DAP and the Roaming Network MDG ("mobile data gateway"). As per standard iDEN Protocol it is not necessary to contact the Subscriber's iHLR for iDEN Packet Data Registration since these parameters would have already been provided to the Roaming Network V_DAP during Dispatch Registration via the "Insert Subscriber Data" message. Also, for iDEN Mobile IP Registration, the Roaming iDEN Subscriber will use the Roaming Network MDG and the Roaming iDEN Subscriber's Home Agent, via the Peer-Network Router, which exists today as part of Nextel's International Direct Connect.

Once an iDEN subscriber is back to its home network, it registers with its home network iHLR (H_iHLR) and the H_iHLR sends CANCEL Location to H_iGW (SaB), which forwards CANCEL Location to Visiting network V_iGW resulting in V_iGW removing the roaming subscriber information from its cache.

Call Flows

Figure 15:
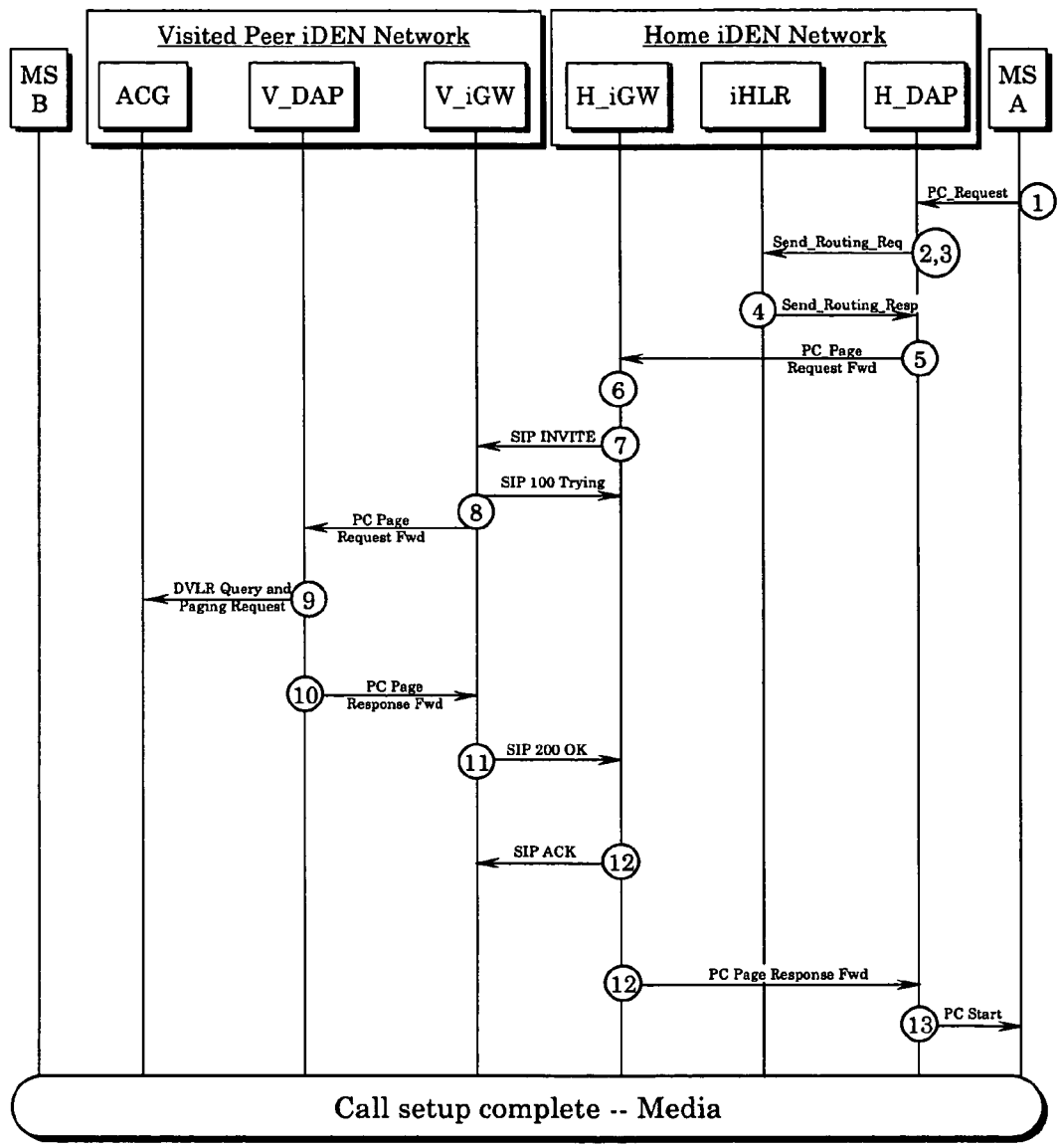
FIG. 15 illustrates signaling for a home network iDEN subscriber calling a roaming subscriber in accordance with exemplary embodiments of the present invention.

FIGS. 15-20 illustrate exemplary call flows in accordance with embodiments of the present invention. FIG. 15 illustrates exemplary signaling for a home network subscriber calling a roaming subscriber. In FIG. 15 MS-A is an iDEN Subscriber in Home Network (e.g., Nextel), MS-B is an iDEN Subscriber roaming in Visited Network (e.g., Telus) and MS-A attempts to Dispatch Private Call MS-B.

In step 1, as per standard iDEN Dispatch Call Protocol, the H_DAP receives a PC Request from MS_A to MS_B. In step 2, the H_DAP initiates standard iDEN call setup procedure to locate the target subscriber (RCR and D-VLR). In this embodiment, no record of the Target (MS-B) is found in the RCR or the DVLR. In step 3, as per standard iDEN Disptch Call Protocol, the H_DAP next performs a GTT lookup based on Target's UFMI (MS-B) to determine MS-B iHLR. The H_DAP sends an iDEN "send routing request" to the serving iHLR of MS_B.

In step 4, the iHLR sends a standard iDEN "send routing response" back to the H_DAP, which includes the CVLR field entry of the target DAP. In this case the DAP iD is the address/iD of V_iGW SaB, which was provided to the iHLR when MS-B Dispatch registered onto the Visited Network.

In step 5, the H_DAP sends an a standard iDEN "PC Page Request Fwd" to the H_iGW. In step 6, upon receipt of the "PC Page Request Fwd" as per standard iGW functionality, the H_iGW performs an UFMI-Network iD lookup in cache, which points MS_B UFMI to the V_iGW. In step 7, the H_iGW forwards the "PC Page Response Fwd" to the V_iGW (via the PTT Translation Gateway) using the standard iGW D2S call (SIP INVITE) message.

In step 8, upon receipt of the "SIP INVITE" message from the H_iGW, the V_iGW initiates standard iGW S2D Call Setup procedures ("SIP_100_Trying" message). The V_iGW also performs an UFMI-to-DAP iD DB Query (via cache), which points the target UFMI (MS_B) to the serving V_DAP. As per standard iDEN Call Procedures, the V_iGW forwards the iDEN "Private Call Page Request Forward" to the V_DAP.

In step 9, upon receipt of the "Private Call Page Request Fwd," the serving V_DAP uses standard iDEN Dispatch Call Procedures (DVLR Query and Paging Requests to all the ACGs in the target's Location Area) to locate MS_B. In step 10, if MS_B is successfully located, the V_DAP returns a successful "Private Call Page Response Forward" message to the V_iGW. In step 11, the V_iGW forwards the "Private Call Page Response Forward" to the H_iGW using standard iGW S2D Call Setup procedures ("SIP_200_OK" message).

In step 12, upon receipt of the "SIP_200_OK" message from the V_iGW, the H_iGW returns a SIP_ACK to the V_iGW, and the H_iGW (P-DAP) forwards the successful "Private Call Page Response Forward" to the H_DAP. As per standard iGW Call Procedure, upon receipt of the SIP_ACK message, the V_iGW forwards a "Private Call Start" message to the terminating serving V_DAP.

In step 13, the H_DAP forwards a "Private Call Start" message to the ACG serving the Originating Subscriber (MS_A). The H_DAP also forwards a "Private Call Start Forward" message to the H_iGW (P-DAP). At this point the Dispatch Call Setup is complete. In one embodiment, when the iGW receives a Private Call Start Forward message from the DAP, the iGW does not interwork this message since the equivalent information is provided in the SIP_ACK message.

Figure 16:
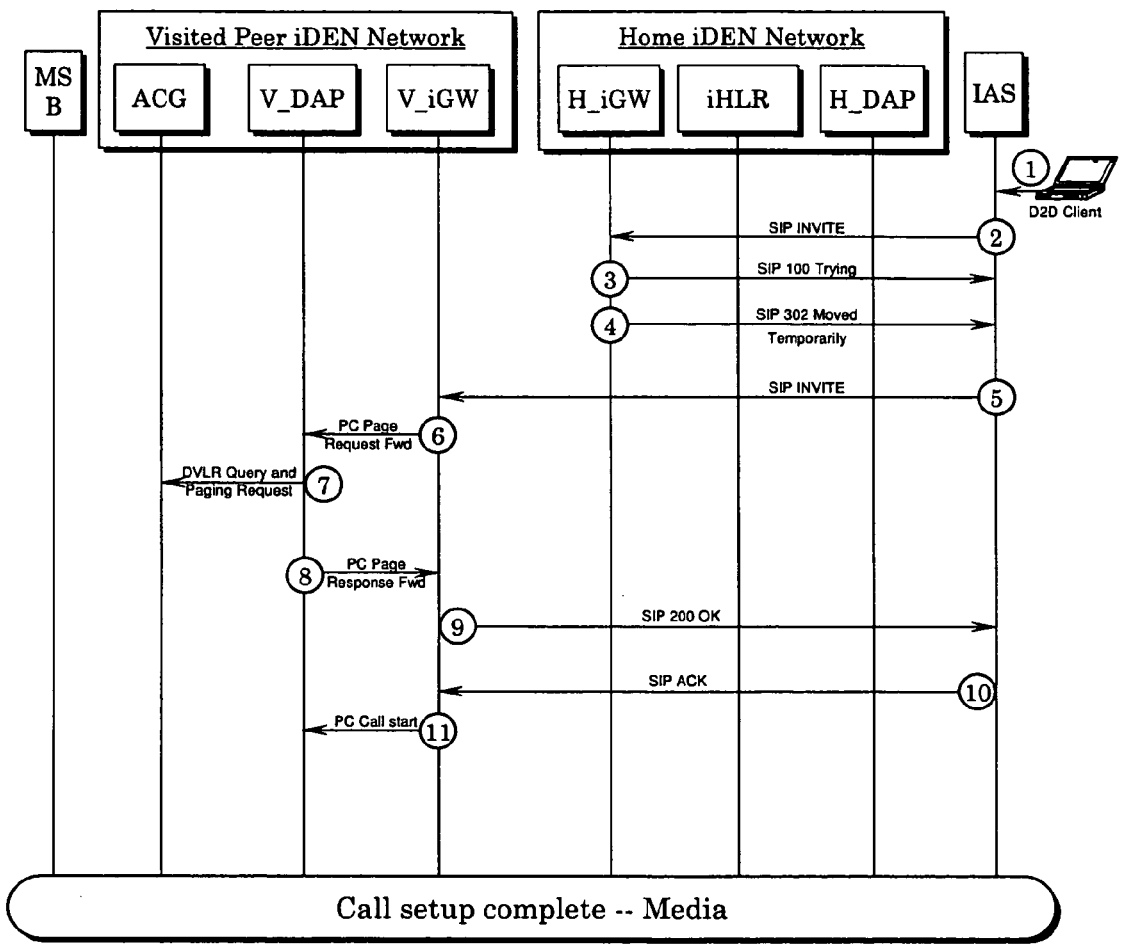
FIG. 16 illustrates signaling for a 3G subscriber calling a roaming subscriber in accordance with exemplary embodiments of the present invention.

FIG. 16 illustrates exemplary signaling for a 3G user (such as a user of the QChat or D2D service clients) calling a roaming subscriber. In FIG. 16 MS-B is an iDEN Subscriber roaming in Visited Network (e.g., Telus) and the 3G User (e.g., QChat or D2D Client) attempts to Dispatch Private Call MS-B.

In step 1, the IAS serving the 3G user receives Private Call request from the 3G User for MS_B. In step 2, the IAS sends a "SIP_INVITE" to the H_iGW based on the UFMI-iGW iD mapping in the IAS. In step 3, the H_iGW sends a SIP "100_Trying" message in response to SIP_INVITE from the IAS, and the H_iGW performs a lookup (cache) on the Target (MS-B) UMFI to locate MS-B Serving DAP. Since the Cache entry for MS-B in the H_iGW is marked as "External" the H_iGW would use the Cache entry for the 3G side, which points MS-B to the V_iGW.

In step 4, the H_iGW forwards a standard SIP redirect message (SIP 302 Moved Temporarily) to the IAS. In the contact header of SIP 302 message, the H_iGW includes the V_iGW iD 3G Signalling address. In step 5, upon receipt of the "SIP 302" message, the IAS sends a "SIP INVITE" message to V_iGW.

In step 6, as per standard iGW Call Procedures the V_iGW performs an UFMI to DAP iD DB Query (Cache), which points the target UFMI (MS_B) to the V_DAP. As per standard iGW Call Procedures the V_iGW forwards an iDEN "Private Call Page Request Forward" to the V_DAP. In step 7, upon receipt of the "Private Call Page Request Fwd," the V_DAP uses standard iDEN Dispatch Call Setup Procedures (DVLR Query and Paging Requests to all the ACGs in the target's Location Area) to locate MS_B.

In step 8, if MS_B is successfully located, the V_DAP returns a successful "Private Call Page Response Forward" message to the V_iGW. In step 9, the V_iGW forwards the "Private Call Page Response Forward" to the IAS using "SIP_200_OK" message. In step 10, upon receipt of the "SIP_200_OK" message from the V_iGW, the IAS returns a SIP_ACK to the V_iGW.

In step 11, upon receipt of the SIP_ACK message, the V_iGW forwards a "Private Call Start" message to the terminating V_DAP. At this point the Dispatch Call Setup is complete.

Figure 17:
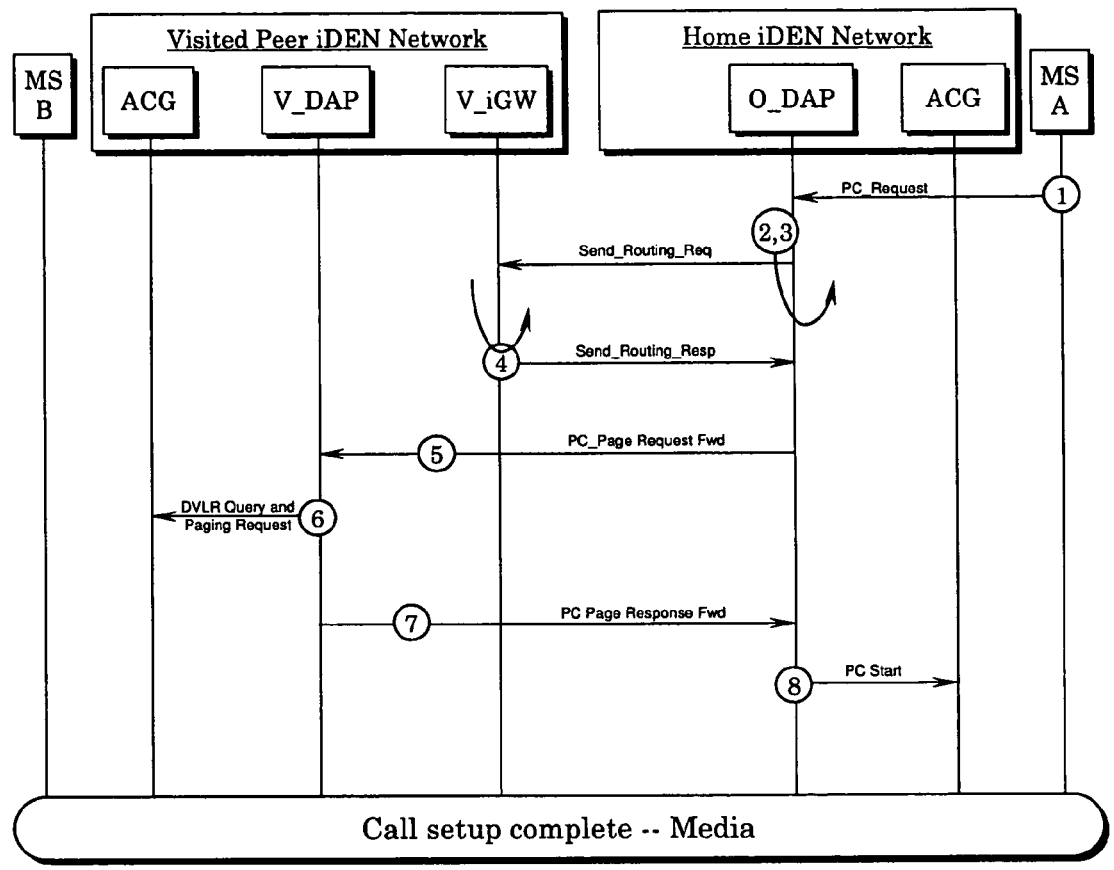
FIG. 17 illustrates signaling for a visiting network subscriber calling a roaming subscriber in accordance with exemplary embodiments of the present invention.

FIG. 17 illustrates exemplary signaling for a visiting network subscriber calling a roaming subscriber. In FIG. 17 MS-A is an iDEN Subscriber in Visited Network (e.g., Telus), MS-B is an iDEN Subscriber roaming in Visited Network (e.g., Telus), and MS-A attempts to Dispatch Private Call MS-B.

In step 1, the O_DAP (Originating DAP) receives the Private Call Request from MS_A to MS_B. In step 2, the O_DAP initiates standard iDEN call setup procedure to locate target subscriber (RCR and D-VLR). It is assumed in this embodiment that no record of the Target (MS-B) is found in the RCR or the DVLR.

In step 3, as per standard iDEN Disptch Call Protocol, O_DAP performs a GTT lookup based on Target's UFMI (MS-B) to determine MS-B iHLR. In this case, MS-B UFMI points to the V_iGW P-iHLR and the O_DAP sends an iDEN "send routing request" to the V_iGW PiHLR. In step 4, V_iGW performs a lookup (cache) on the Target (MS-B) UMFI to locate MS-B Serving DAP. Since the Cache entry for MS-B in the V_iGW is marked as "Internal" the V_iGW would use the Cache entry for the 3G side, which points MS-B to a V_DAP.

In step 5, upon receipt of the "send routing request response" from the V_iGW P-iHLR, the O_DAP sends a "Private Call Page Request Fwd" message to V_DAP, which serves MS-B. In step 6, upon receipt of the "Private Call Page Request Fwd," the V_DAP uses standard iDEN Dispatch Call Setup Procedures (DVLR Query and Paging Requests to all the ACGs in the target's Location Area) to locate MS_B.

In step 7, if MS_B is successfully located, V_DAP returns a successful "Private Call Page Response Forward" message to the O_DAP. In step 8, the O_DAP forwards a "Private Call Start" message to the ACG serving the Originating Subscriber (MS_A). The O_DAP also forwards a "Private Call Start Forward" message to the V_DAP. At this point the Dispatch Call Setup between two mobile stations is complete.

Figure 18:
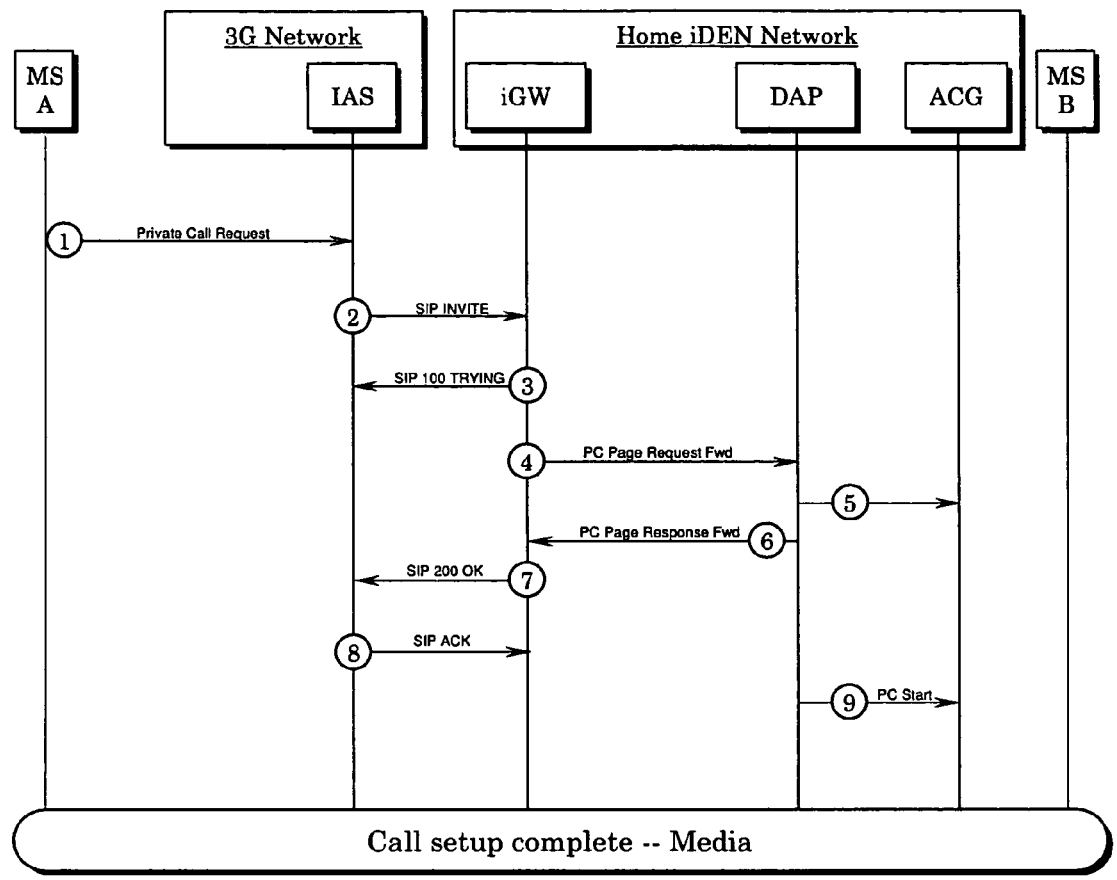
FIG. 18 illustrates signaling for a 3G network subscriber calling another 3G subscriber (with a dual mode handset) roaming in an iDEN network in accordance with exemplary embodiments of the present invention.

FIG. 18 illustrates exemplary signaling for a 3G network subscriber calling another 3G subscriber (with dual mode handset) roaming in, for example, an iDEN network. In FIG. 18 MS-A is a 3G subscriber in 3G Network (e.g., IMS), MS-B is a 3G subscriber roaming in iDEN network (e.g., Nextel), and MS-A attempts to Dispatch Private Call MS-B. In this embodiment, a Dispatch Translation Gateway in the iDEN network performs address translation (URI-UFMI-URI).

In step 1, the IAS serving the 3G user receives Private Call request from the 3G User for MS_B who is the roaming in Nextel iDEN network with dual mode (iDEN/3G) handset. In step 2, the IAS sends a "SIP_INVITE" to the Nextel iDEN network iGW based on the URI-iGW iD mapping in the IAS.

In step 3, iGW sends back SIP 100 TRYING in response to SIP INVITE from the IAS. In step 4, as per standard iGW Call Procedures the iGW performs an UFMI to DAP iD DB Query (Cache), which points the target UFMI (MS_B) to the serving DAP. The iGW forwards an iDEN "Private Call Page Request Forward" to the DAP.

In step 5, upon receipt of the "Private Call Page Request Fwd," the DAP uses standard iDEN Dispatch Call Setup Procedures (DVLR Query and Paging Requests to all the ACGs in the target's Location Area) to locate MS_B. In step 6, if MS_B is successfully located, the DAP returns a successful "Private Call Page Response Forward" message to the iGW. In step 7, the iGW forward as the "Private Call Page Response Forward" to the IAS using SIP 200 OK message. In step 8, upon receipt of the "SIP_200_OK" message from the iGW, the IAS returns a SIP_ACK to the iGW. In step 9, the DAP forwards a "Private Call Start" message to the ACG serving the MS-B. The serving DAP also forwards a "Private Call Start Forward" message to the iGW (P-DAP).

Figure 19:
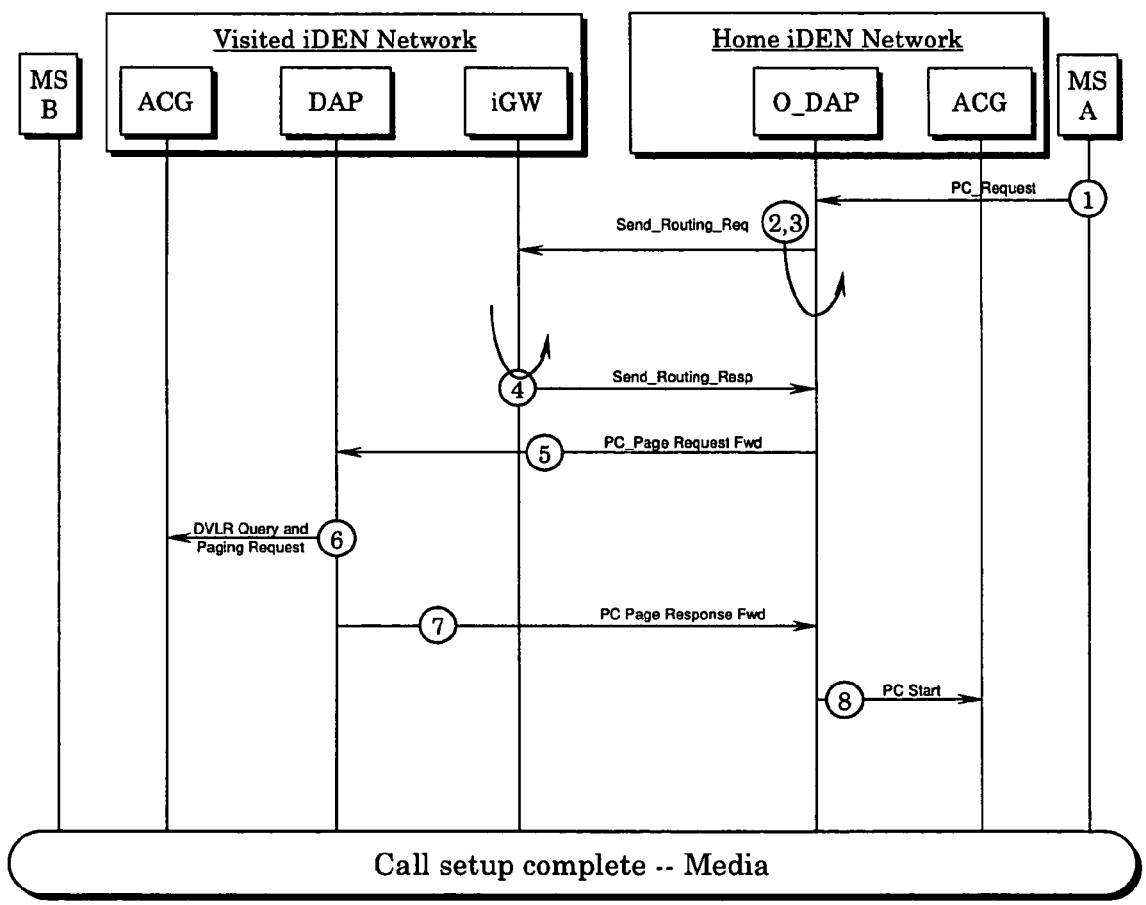
FIG. 19 illustrates signaling for an iDEN subscriber calling a roaming 3G subscriber (with a dual mode handset) in an iDEN network in accordance with exemplary embodiments of the present invention.

FIG. 19 illustrates exemplary signaling for an iDEN subscriber calling a roaming 3G subscriber (with dual mode handset) in, for example, an iDEN Network. In FIG. 19 MS-A is an iDEN Subscriber in home network (e.g., Nextel iDEN), MS-B is a 3G Subscriber roaming in, for example, the iDEN Network with its dual mode handset, and MS-A attempts to Dispatch Private Call MS-B.

In step 1, the O_DAP (Originating DAP) will receive the Private Call Request from MS_A to MS_B. In step 2, the O_DAP initiates standard iDEN call setup procedure to locate target subscriber (RCR and D-VLR). In this embodiment, no record of the Target (MS-B) is found in the RCR or the DVLR. In step 3, as per standard iDEN Disptch Call Protocol, O_DAP performs a GTT lookup based on Target's UFMI (MS-B) to determine MS-B iHLR. In this case, MS-B UFMI points to the iDEN iGW P-iHLR and the O_DAP sends an iDEN "send routing request" to the iDEN iGW PiHLR.

In step 4, the iDEN iGW performs a lookup (cache) on the Target (MS-B) UMFI to locate MS-B Serving DAP, the cache points MS-B to an iDEN "Serving" DAP to MS-B. In step 5, upon receipt of the "send routing request response" from the iDEN iGW P-iHLR, the O_DAP sends a "Private Call Page Request Fwd" message to the DAP, which serves MS-B. In step 6, upon receipt of the "Private Call Page Request Fwd," the MS-B serving DAP uses standard iDEN Dispatch Call Setup Procedures (DVLR Query and Paging Requests to all the ACGs in the target's Location Area) to locate MS_B.

In step 7, if MS_B is successfully located, MS-B serving DAP will return a successful "Private Call Page Response Forward" message to the O_DAP. In step 8, the O_DAP forwards a "Private Call Start" message to the ACG serving the Originating Subscriber (MS_A). The O_DAP will also forward a "Private Call Start Forward" message to the DAP that is serving MS-B. At this point the Dispatch Call Setup is complete.

Figure 20:
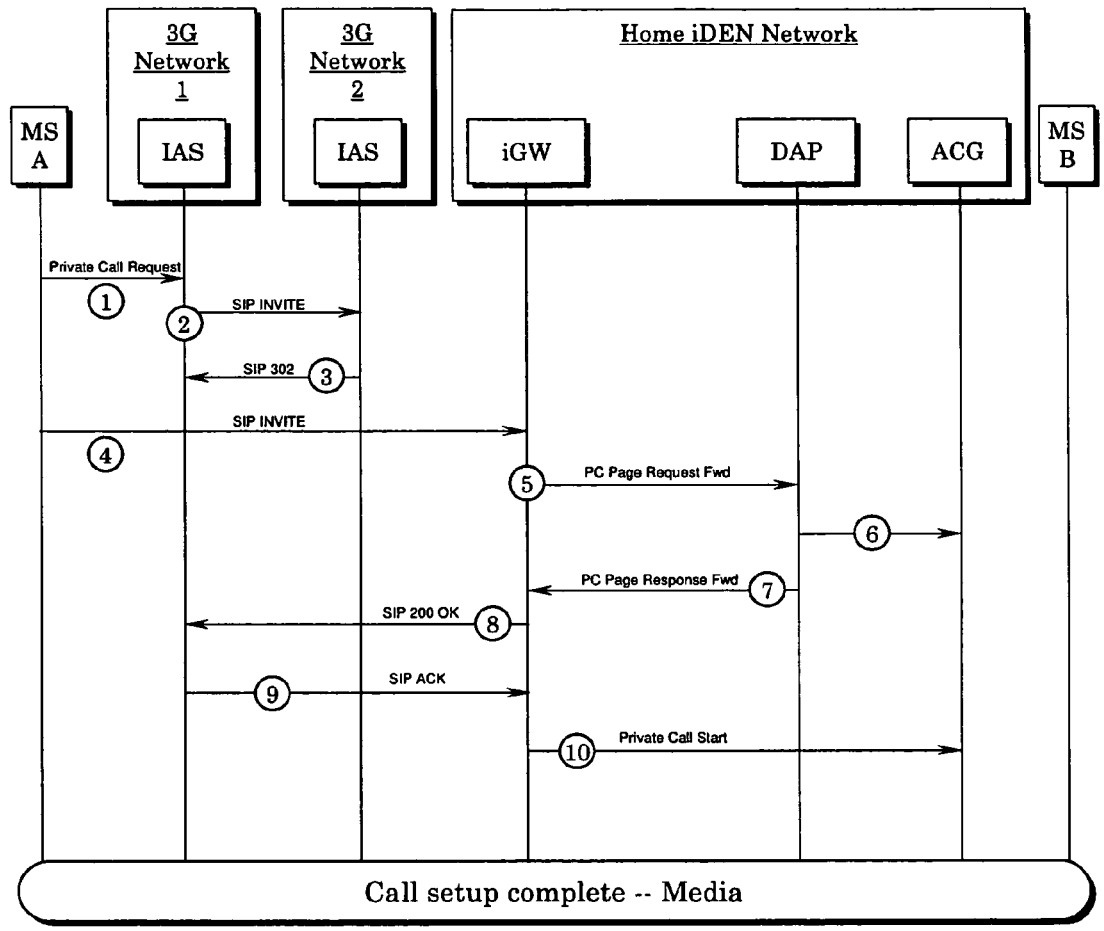
FIG. 20 illustrates signaling for an other 3G subscriber calling a 3G roaming subscriber (with a dual mode handset) in an iDEN network in accordance with exemplary embodiments of the present invention.

FIG. 20 illustrates exemplary signaling for other 3G subscribers calling 3G roaming subscriber (with dual mode handset) in an iDEN network (e.g., Nextel). In FIG. 20 MS-A is an other 3G Subscriber (e.g., Telus), MS-B is an other 3G Subscriber roaming in the iDEN Network with its dual mode handset, and MS-A attempts to Dispatch Private Call MS-B. In this embodiment, a Dispatch Translation Gateway in Nextel's network performs address translation (URI-UFMI-URI).

In step 1, the IAS serving the user MS-A on the first 3G network (3G_1) receives Private Call request for a 3G user MS_B from the second 3G network (3G_2) who is currently roaming on the iDEN network. In step 2, the 3G_1 IAS sends a "SIP_INVITE" to the other 3G network IAS based on the URI-Domain mapping in the 3G_1 IAS.

In step 3, the other 3G IAS (from 3G_2) forwards a standard SIP redirect message (SIP 302 Moved Temporarily) to the 3G_1 IAS. In the contact header of SIP 302 message, the 3G_2 IAS includes the iDEN iGW iD 3G Signalling address where MS-B is roaming. In step 4, upon receipt of the "SIP 302" message, the 3G_1 IAS sends a "SIP INVITE" message to the iDEN iGW.

In step 5, as per standard iGW Call Procedures the iDEN iGW will perform an UFMI to DAP iD DB Query (Cache), which points the target UFMI (MS_B) to the DAP serving MS-B. As per standard iGW Call Procedures the iDEN iGW will forward an iDEN "Private Call Page Request Forward" to the MS-B serving DAP.

In step 6, upon receipt of the "Private Call Page Request Fwd," the serving DAP uses standard iDEN Dispatch Call Setup Procedures (DVLR Query and Paging Requests to all the ACGs in the target's Location Area) to locate MS_B.

In step 7, if MS_B is successfully located, the DAP returns a successful "Private Call Page Response Forward" message to the iGW. In step 8, the iGW forwards the "Private Call Page Response Forward" to the IAS using "SIP_200_OK" message. In step 9, upon receipt of the "SIP_200_OK" message from the iGW, the IAS returns a SIP_ACK to the iDEN iGW. In step 10, upon receipt of the SIP_ACK message, the iDEN iGW forwards a "Private Call Start" message to the terminating DAP serving MS-B.

While the invention has been described in connection with various embodiments, it will be understood that the invention is capable of further modifications. This application is intended to cover any variations, uses or adaptation of the invention following, in general, the principles of the invention, and including such departures from the present disclosure as, within the known and customary practice within the art to which the invention pertains.

What is claimed is:

1. A wireless communications system comprising:
   a first gateway associated with an Integrated Digital Enhanced Network (iDEN) network and configured to route dispatch registration information corresponding to roaming dispatch subscribers;
   a second gateway associated with an external dispatch network and configured to route dispatch registration information corresponding to roaming dispatch subscribers; and
   a PTT interoperability infrastructure (PII) roaming entity oriented between the first and second gateways and adapted to facilitate dispatch roaming registration of roaming dispatch subscribers via the first and second gateways, and to facilitate dispatch call setup between the iDEN network and the external dispatch network for roaming dispatch subscribers.

2. The wireless communications system of claim 1 wherein the first gateway further comprises a roaming registration cache storing inter-carrier roaming information for at least one roaming subscriber.

3. The wireless communications system of claim 2 wherein the roaming registration cache includes a table storing International Mobile Subscriber Identity (IMSI), an Urban Fleet Member ID (UFMI) and Internet Authentication Service (IAS) information.

4. The wireless communications system of claim 1 wherein the first gateway further comprises:
   a processor; and
   a program memory storing instructions for causing the processor to perform steps comprising tracking the location of a roaming iDEN subscriber on the external dispatch network, and facilitating dispatch communications between a roaming iDEN subscriber and a second subscriber.

5. The wireless communications system of claim 4 wherein the step of tracking further comprises receiving a registration update from the roaming network and updating the iDEN Network with the location of the subscriber.

6. The wireless communications system of claim 4 wherein the step of facilitating further comprises receiving a dispatch call request for the roaming iDEN subscriber, and setting up the requested dispatch call.

7. The wireless communications system of claim 1 wherein the first gateway connects an iDEN domain to a SIP domain.

8. The wireless communications system of claim 1 wherein the PII roaming entity further comprises:
   a SIP Registrar;
   a SIP Proxy Server; and
   a location service database.

9. The wireless communications system of claim 8 wherein the SIP registrar is adapted to receive a dispatch registration request from a roaming subscriber and record the roaming subscriber's address of record and contact information in the location services database.

10. The wireless communications system of claim 8 wherein the PII roaming entity further comprises an IMSI to iGW mapping function, and a IMSI to iDEN System HLR mapping function.

11. The wireless communications system of claim 10 wherein the SIP registrar uses the IMSI to iGW mapping function to route a dispatch registration request received from a roaming subscriber to the first gateway, wherein the first gateway is a home iDEN gateway associated with the roaming subscriber.

12. In a wireless communications systems including a plurality of Integrated Digital Enhanced Network (iDEN) gateways, a method for facilitating iDEN to iDEN dispatch roaming registration, the method comprising the acts of:
   receiving at a visited iDEN network a dispatch registration request from a roaming iDEN subscriber;
   forwarding the request to a visited iDEN gateway; and
   determining, at the visited iDEN gateway, a home domain associated with the roaming iDEN subscriber; and
   transmitting a SIP register message to a PTT interoperability infrastructure (PII) roaming entity associated with the roaming iDEN subscriber, wherein the PII roaming entity is oriented between the visited iDEN gateway and a home iDEN gateway serving a home iDEN system of the roaming iDEN subscriber.

13. The method of claim 12 further comprising the acts of:
   forwarding, by the PII roaming entity, the SIP register message to the home iDEN gateway serving a home iDEN system of the roaming iDEN subscriber.

14. The method of claim 13 further comprising the acts of:
   sending, by the home iDEN system, an authentication request to the visited iDEN gateway, including authentication triplets and fleet data associated with the roaming iDEN subscriber.

15. The method of claim 14 further comprising the acts of:
   transmitting by the visited iDEN network a dispatch registration request to the PII roaming entity via the visiting iDEN gateway using SIP protocol;
   forwarding by the PII roaming entity the SIP registration message to the home iDEN gateway; and
   forwarding by the home iDEN gateway the registration request to the home iDEN network using an iDEN protocol.

16. The method of claim 15 further comprising the acts of:
   the visited iDEN network transmitting a registration request including a mapping of the roaming iDEN subscriber's home address to an address on the visited iDEN network.

17. A wireless communications system comprising:
   a PTT interoperability infrastructure (PII) roaming entity adapted to facilitate dispatch roaming registration of roaming dispatch subscribers and dispatch call setup between a home Integrated Digital Enhanced Network (iDEN) network and at least one external dispatch network;
   a first gateway, associated with a home iDEN network, and configured to route dispatch registration information corresponding to roaming dispatch subscribers between the PII roaming entity and the home iDEN network; and
   a second gateway, associated with an external dispatch network wherein the second gateway is configured to receive a dispatch registration request from a roaming iDEN subscriber and to forward said dispatch registration request to the PII roaming entity, wherein the PII roaming entity is oriented between the first gateway and the second gateway.

18. The wireless communications system of claim 17 wherein the PII roaming entity is further configured to forward a SIP register message to the first gateway when the home iDEN network is a home network for the roaming iDEN subscriber.

19. The wireless communications system of claim 17, wherein the second gateway is further configured to receive an authentication request from the home iDEN network the roaming iDEN subscriber.

20. The wireless communications system of claim 14, wherein the external dispatch network is further configured to transmit a dispatch registration request to the PII roaming entity via the second gateway using SIP protocol.

21. The wireless communications system of claim 20, wherein the PII roaming entity is configured to forward the SIP registration message to the first gateway.

22. The wireless communications system of claim 21, wherein the first gateway is further configured to forward the dispatch registration request to the home iDEN network using an iDEN protocol.

* * * * *